US012001633B2

(12) United States Patent
Kakinoki

(10) Patent No.: US 12,001,633 B2
(45) Date of Patent: Jun. 4, 2024

(54) DETECTING DEVICE DETECTS COORDINATES OF AN OBJECT BASED ON A DIFFERENCE VALUE BETWEEN VALUES DETECTED BY A DETECTION ELECTRODE DURING TWO PERIODS

(71) Applicant: Japan Display Inc., Tokyo (JP)

(72) Inventor: Yuto Kakinoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/200,310

(22) Filed: May 22, 2023

(65) Prior Publication Data

US 2023/0409147 A1 Dec. 21, 2023

(30) Foreign Application Priority Data

May 24, 2022 (JP) ................................ 2022-084847

(51) Int. Cl.
*G06F 3/041* (2006.01)
*G06F 3/044* (2006.01)

(52) U.S. Cl.
CPC ...... *G06F 3/04186* (2019.05); *G06F 3/04166* (2019.05); *G06F 3/044* (2013.01); *G06F 2203/04108* (2013.01)

(58) Field of Classification Search
None
See application file for complete search history.

(56) References Cited

U.S. PATENT DOCUMENTS

| | | | |
|---|---|---|---|
| 2012/0287055 A1* | 11/2012 | Cheng | G06F 3/0446 345/173 |
| 2013/0342498 A1 | 12/2013 | Kim et al. | |
| 2014/0049486 A1 | 2/2014 | Kim et al. | |
| 2014/0049508 A1 | 2/2014 | Kim et al. | |
| 2015/0153870 A1* | 6/2015 | Lee | G06F 3/0446 345/174 |
| 2016/0313845 A1* | 10/2016 | Lin | G06F 3/044 |
| 2017/0300166 A1* | 10/2017 | Rosenberg | G06F 3/0443 |
| 2018/0095587 A1* | 4/2018 | Kurasawa | G06F 3/0445 |
| 2020/0133409 A1* | 4/2020 | Tanemura | G06F 3/0443 |
| 2022/0171498 A1* | 6/2022 | Oh | G06F 3/04166 |

* cited by examiner

*Primary Examiner* — Kirk W Hermann
(74) *Attorney, Agent, or Firm* — K&L Gates LLP

(57) ABSTRACT

A detecting device includes a sensor unit having a detection region in which a plurality of detection electrodes are arrayed, and a detector configured to supply a drive signal to the detection electrodes and detect a position of an object to be detected in a space on the detection region based on an output value of each of the detection electrodes.

7 Claims, 21 Drawing Sheets

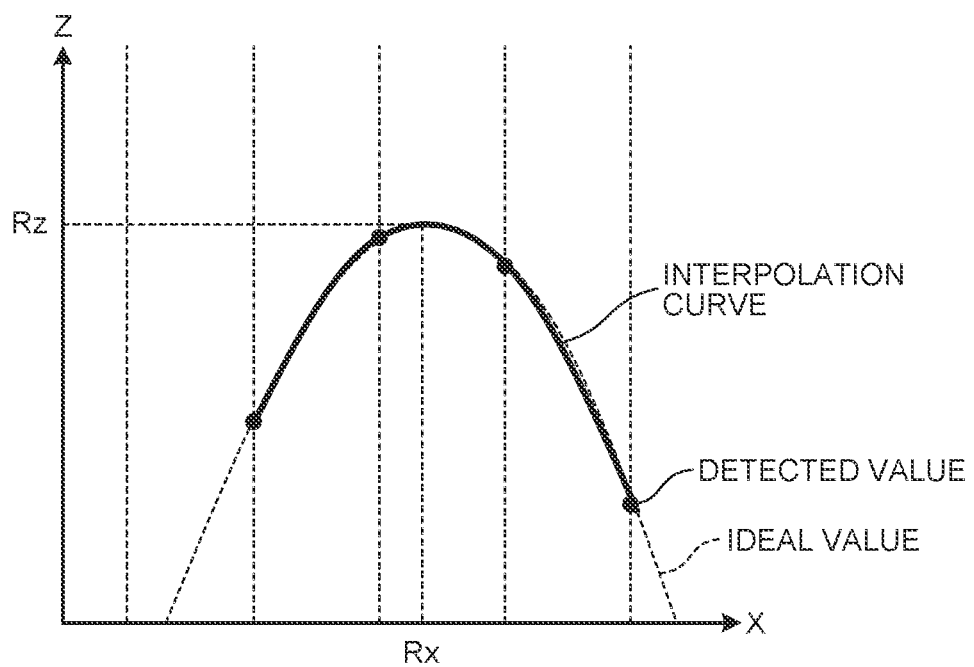

FIG.22
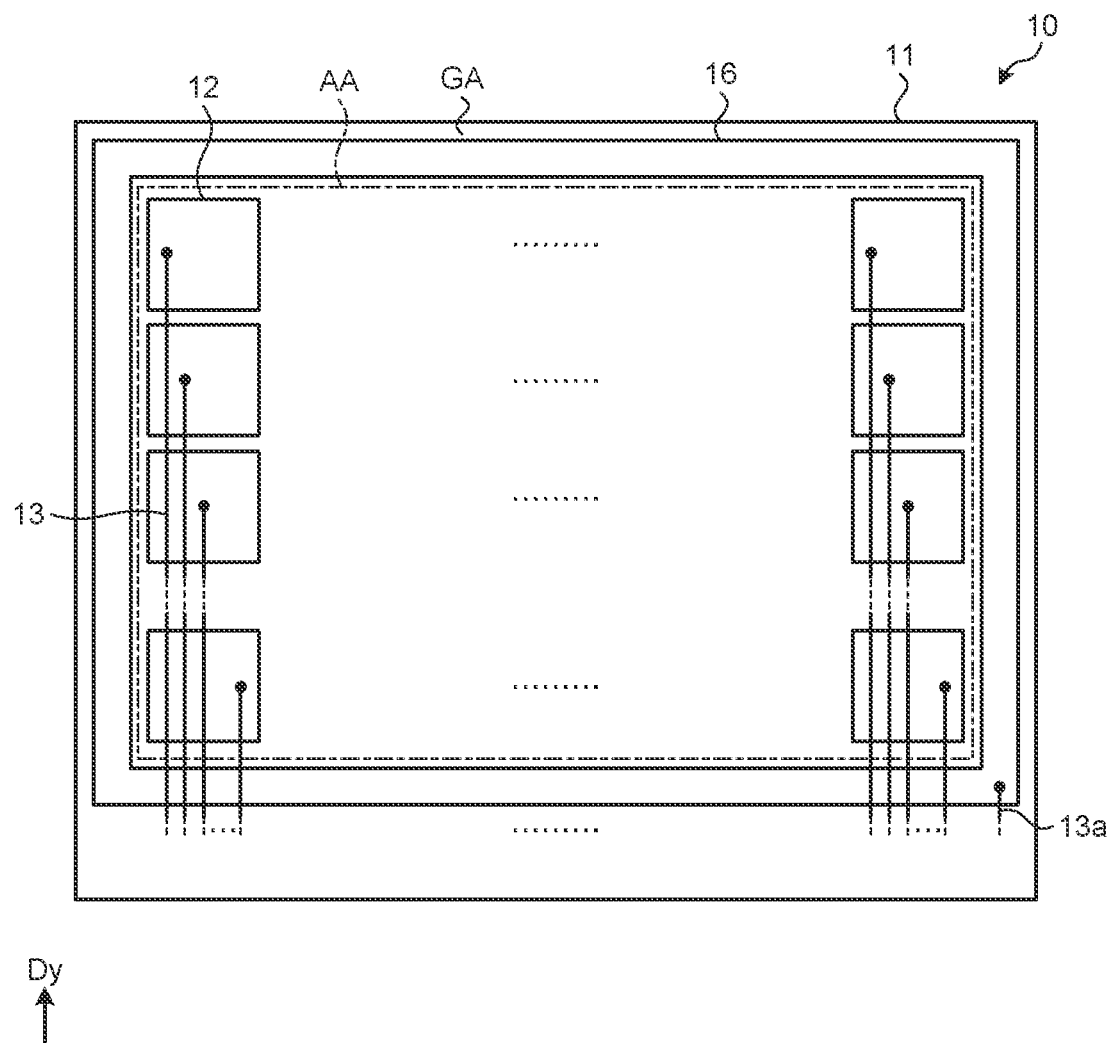
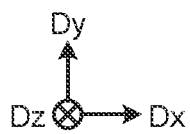

DETECTING DEVICE DETECTS COORDINATES OF AN OBJECT BASED ON A DIFFERENCE VALUE BETWEEN VALUES DETECTED BY A DETECTION ELECTRODE DURING TWO PERIODS

CROSS-REFERENCE TO RELATED APPLICATION

This application claims the benefit of priority from Japanese Patent Application No. 2022-084847 filed on May 24, 2022, the entire contents of which are incorporated herein by reference.

BACKGROUND

1. Technical Field

The present invention relates to a detecting device.

2. Description of the Related Art

Recently known are detection systems, what are called touch panels, in which a detecting device capable of detecting an external proximity object is mounted on or integrated with a display device, such as a liquid crystal display device. In such detection systems, not only a touch detection function but also what is called a hover detection function has been attracting attention. The touch detection function is a function to detect contact of an object to be detected, such as an operator's finger, with a detection surface. The hover detection function is a function to detect a proximity state of the finger not in contact with the detection surface and movement of the finger, such as a gesture, in a space on a detection region.

In a configuration that detects capacitance generated in detection electrodes to detect the spatial coordinates of the position where the object to be detected is present on the detection region, it is necessary to enhance the detection sensitivity compared with a configuration that detects the plane coordinates indicating the contact position of the object to be detected with the detection surface. As a result, the detecting device is more likely to be affected by parasitic capacitance generated between the detection electrodes and a conductor having an electric potential different from that of the detection electrodes, which may possibly reduce the accuracy of detecting the position of the object to be detected in the space on the detection region.

An object of the present invention is to provide a detecting device that can improve the accuracy of detecting the position of an object to be detected in a space on a detection region.

SUMMARY

A detecting device according to an embodiment of the present disclosure includes a sensor unit having a detection region in which a plurality of detection electrodes are arrayed, and a detector configured to supply a drive signal to the detection electrodes and detect a position of an object to be detected in a space on the detection region based on an output value of each of the detection electrodes. The sensor unit comprises a peripheral electrode provided along an outer periphery of the detection region, the detector calculates a first detected value based on the output value of the detection electrode in a first period for supplying the drive signal to the peripheral electrode, the detector calculates a second detected value based on the output value of the detection electrode in a second period for supplying a voltage signal different from the drive signal to the peripheral electrode, and the detector calculates spatial coordinates of the object to be detected in the space on the detection region using a value calculated based on a difference value between the first detected value and the second detected value.

BRIEF DESCRIPTION OF THE DRAWINGS

FIG. 5 is a conceptual diagram of an example of the method for calculating the spatial coordinates of the object to be detected;

FIG. 22 is a plan view of a schematic configuration of the sensor unit according to a first modification.

DETAILED DESCRIPTION

Figure 1:
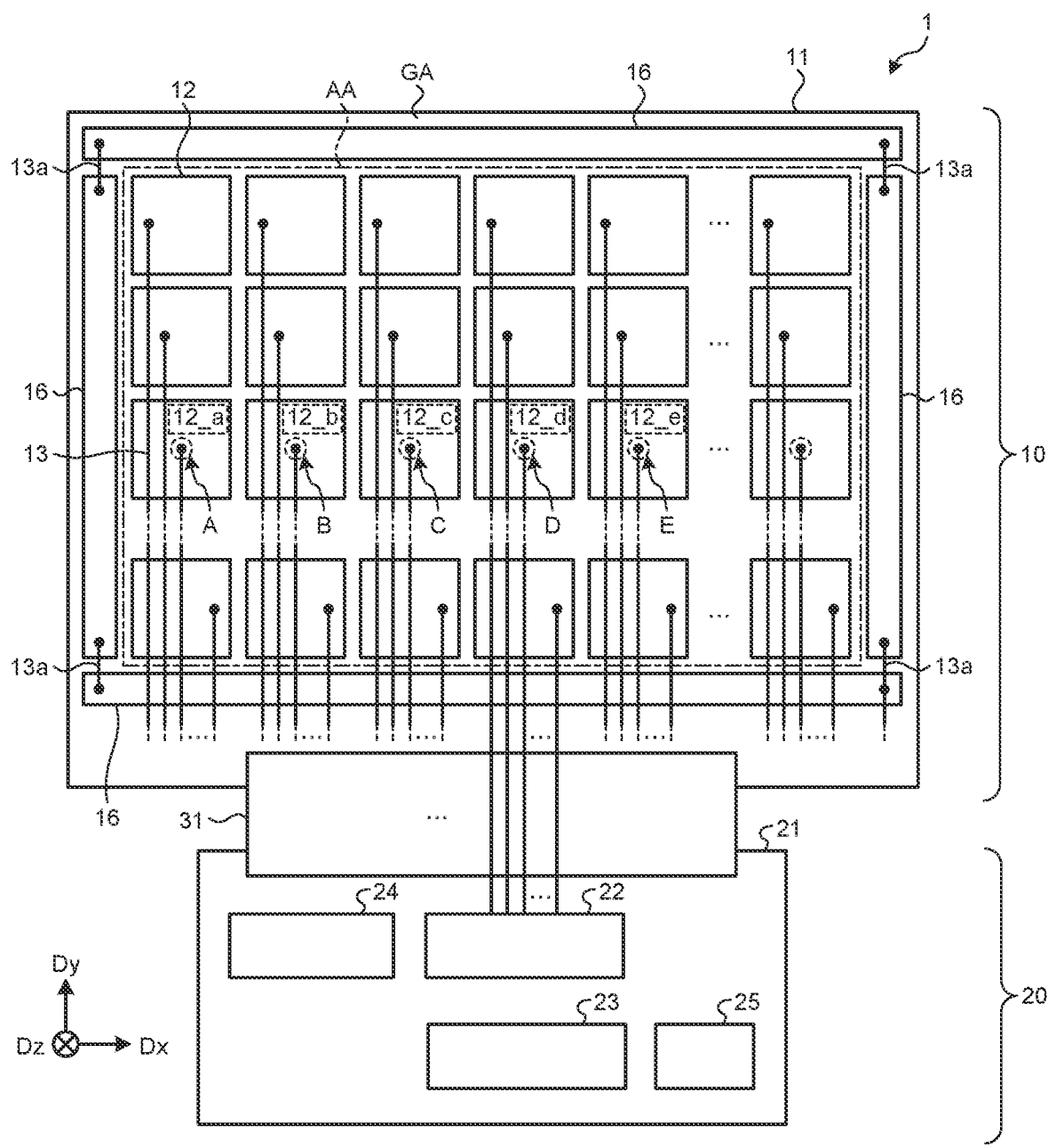
FIG. 1 is a plan view of a schematic configuration of a detecting device according to an embodiment.

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the present invention. To simplify the explanation, the drawings may possibly illustrate the width, the thickness, the shape, and other elements of each unit more schematically than those in the actual aspect. These elements, however, are given by way of example only and are not intended to limit interpretation of the present invention. In the present specification and the drawings, components similar to those previously described with reference to previous drawings are denoted by like reference numerals, and detailed explanation thereof may be appropriately omitted.

FIG. 1 is a plan view of a schematic configuration of a detecting device according to an embodiment. As illustrated in FIG. 1, a detecting device 1 includes a sensor unit 10 and a detector 20.

The sensor unit 10 includes a sensor substrate 11, a plurality of detection electrodes 12, and peripheral electrodes 16. The detector 20 includes a control substrate 21, a detection circuit 22, a processing circuit 23, a power circuit 24, and an interface circuit 25.

The sensor substrate 11 is a glass substrate or translucent flexible printed circuits (FPC), for example. The sensor substrate 11 has a detection region AA and a peripheral region GA.

The detection region AA of the sensor substrate 11 is a region provided with the detection electrodes 12. In the detection region AA, M (M is a natural number) detection electrodes 12 are arrayed in a Dx direction (first direction), and N (N is a natural number) detection electrodes 12 are arrayed in a Dy direction (second direction).

The peripheral region GA of the sensor substrate 11 is a region between the outer periphery of the detection region AA and the ends of the sensor substrate 11 and is provided with no detection electrode 12. In the present disclosure, the peripheral region GA is provided with four peripheral electrodes 16 along the respective sides of the detection region AA. The four peripheral electrodes 16 are coupled by the pieces of wiring 13a.

In the present disclosure, the Dx direction (first direction) and the Dy direction (second direction) are orthogonal to each other in the detection region AA. In the present disclosure, the direction orthogonal to the Dx direction (first direction) and the Dy direction (second direction) is a Dz direction (third direction).

The control substrate 21 is electrically coupled to the sensor substrate 11 via a wiring substrate 31. The wiring substrate 31 is flexible printed circuits, for example. Each detection electrode 12 of the sensor unit 10 is coupled to the detection circuit 22 of the detector 20 via the wiring substrate 31.

The control substrate 21 is provided with the detection circuit 22, the processing circuit 23, the power circuit 24, and the interface circuit 25. The control substrate 21 is a rigid substrate, for example.

The detection circuit 22 detects an output value of each detection electrode 12 based on a detection signal of each detection electrode 12 output from the sensor substrate 11. The detection circuit 22 is an analog front end (AFE) IC, for example.

The processing circuit 23 generates the spatial coordinates indicating the position where an object to be detected (e.g., an operator's finger) is present on the detection region AA based on the output value of each detection electrode 12 output from the detection circuit 22. The processing circuit 23 may be a programmable logic device (PLD), such as a field programmable gate array (FPGA), or a micro control unit (MCU), for example.

The power circuit 24 is a circuit that supplies electric power to the detection circuit 22 and the processing circuit 23. The power circuit 24 is also a circuit that supplies drive signals for detection to the detection circuit 22.

The interface circuit 25 is a USB controller IC, for example, and is a circuit that controls communications between the processing circuit 23 and a host controller (not illustrated) of a host device on which the detection system is mounted.

Figure 2:
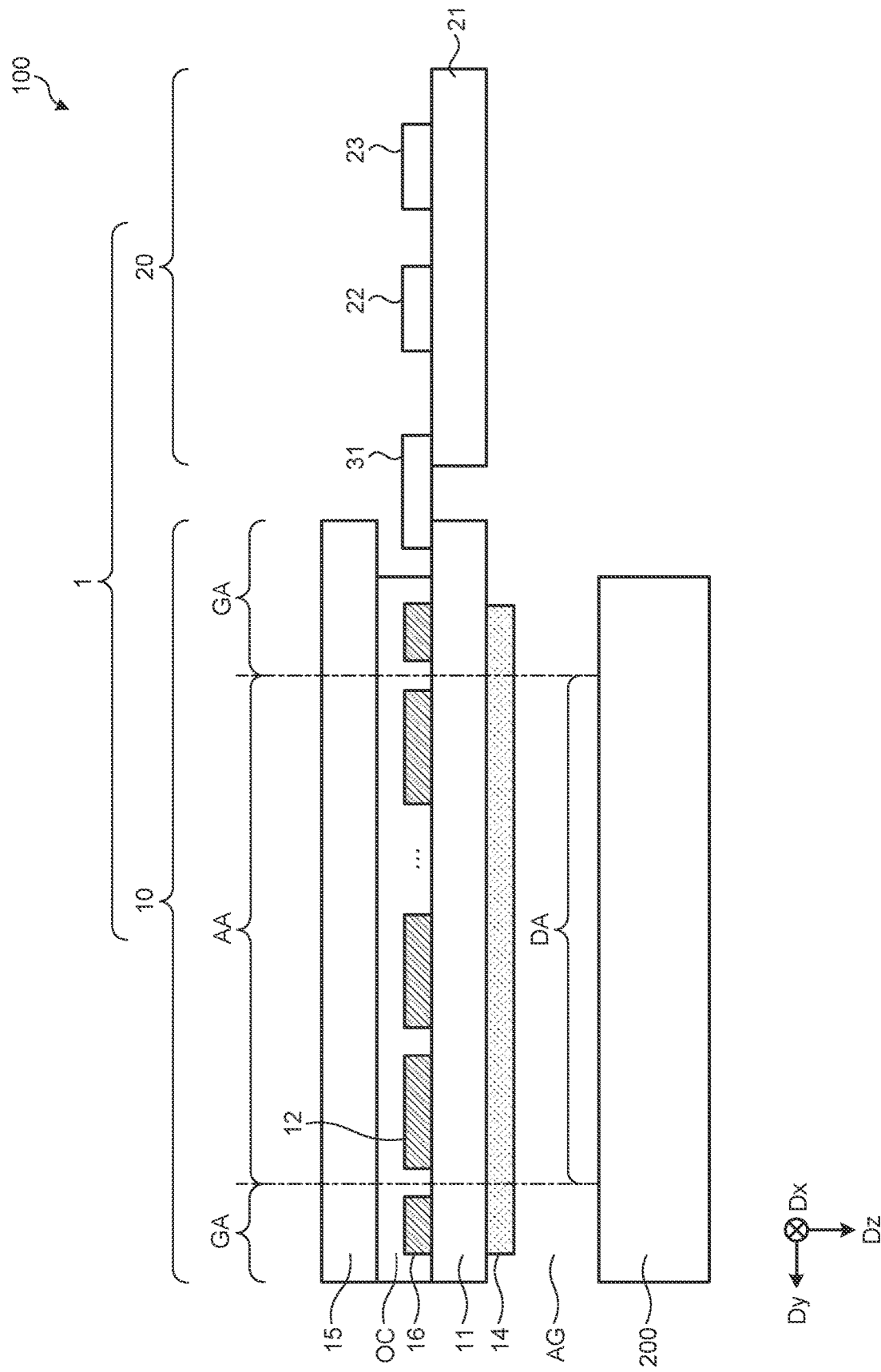
FIG. 2 is a schematic of a schematic sectional configuration of a detection system in which the detecting device according to the embodiment is used.

FIG. 2 is a schematic of a schematic sectional configuration of the detection system in which the detecting device according to the embodiment is used.

A detection system 100 includes the detecting device 1 and a display panel 200. The display panel 200 is disposed facing the sensor unit 10 of the detecting device 1 with an air gap AG interposed therebetween. The sensor unit 10 of the detecting device 1 is disposed such that the detection region AA of the sensor unit 10 and a display region DA of the display panel 200 overlap in the Dz direction (third direction) in plan view. The display panel 200 is a liquid crystal display (LCD), for example. The display panel 200 may be an organic EL display (organic light-emitting diode (OLED)), an inorganic EL display (a micro LED or a mini LED), or a transparent display that displays an image on a translucent display surface, for example.

The sensor unit 10 includes the sensor substrate 11, the detection electrodes 12, a shield electrode 14, the peripheral electrodes 16, and a cover glass 15. The sensor unit 10 is composed of the shield electrode 14, the sensor substrate 11, the detection electrodes 12, the peripheral electrodes 16, and the cover glass 15 stacked in this order on the display panel 200.

The shield electrode 14 is provided on a first surface of the sensor substrate 11 facing the display panel 200. The detection electrodes 12 and the peripheral electrodes 16 are provided on a second surface of the sensor substrate 11 opposite to the first surface. The shield electrode 14 is provided in a region overlapping the detection electrodes 12 and the peripheral electrodes 16 on the first surface of the sensor substrate 11. The cover glass 15 is provided on the side of the second surface of the sensor substrate 11 with an adhesive layer OC interposed therebetween. The adhesive layer OC is preferably made of translucent adhesive. The adhesive layer OC may be made of a translucent double-sided adhesive film, such as optical clear adhesive (OCA).

Figure 3:
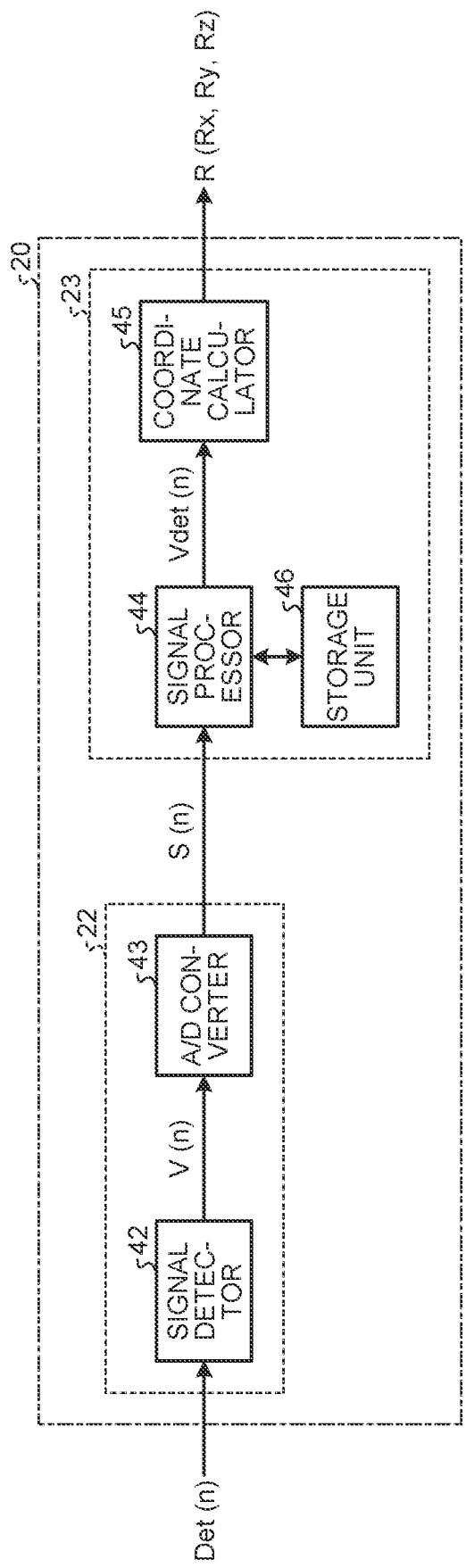
FIG. 3 is a block diagram of an exemplary configuration of a detector of the detecting device according to the embodiment.

FIG. 3 is a block diagram of an exemplary configuration of the detector of the detecting device according to the embodiment. In the present disclosure, the detector 20 detects the position (coordinates) of the object to be detected in the space on the detection region AA.

As illustrated in FIG. 3, the detector 20 includes a signal detector 42, an A/D converter 43, a signal processor 44, a coordinate calculator 45, and a storage unit 46. The signal detector 42 and the A/D converter 43 are included in the detection circuit 22. The signal processor 44, the coordinate calculator 45, and the storage unit 46 are included in the processing circuit 23.

The signal detector 42 generates an output value V(n) of each detection electrode 12 based on a detection signal Det(n) (n is a natural number from 1 to N, where N is the number of electrodes in the detection region AA) of each detection electrode 12 output from the sensor substrate 11. The A/D converter 43 samples the output value V(n) of each detection electrode 12 and converts it into an output value S(n) of a digital signal.

The signal processor 44 performs a detection reference value acquisition process for generating a detection reference value and a detected value calculation process to generate a detected value Vdet(n) of each detection electrode 12. The detection reference value, the detection reference value acquisition process, and the detected value calculation process will be described later.

The coordinate calculator 45 calculates spatial coordinates R (Rx,Ry,Rz) of the position where the object to be detected is present based on the detected value Vdet(n) of each detection electrode 12.

The storage unit 46 stores therein the detection reference value obtained in the detection reference value acquisition process. The storage unit 46 also stores therein a correction coefficient function used in the detected value calculation process. The storage unit 46 also has a function of temporarily storing therein intermediate data calculated in the processing performed by the signal processor 44.

Figure 4A:
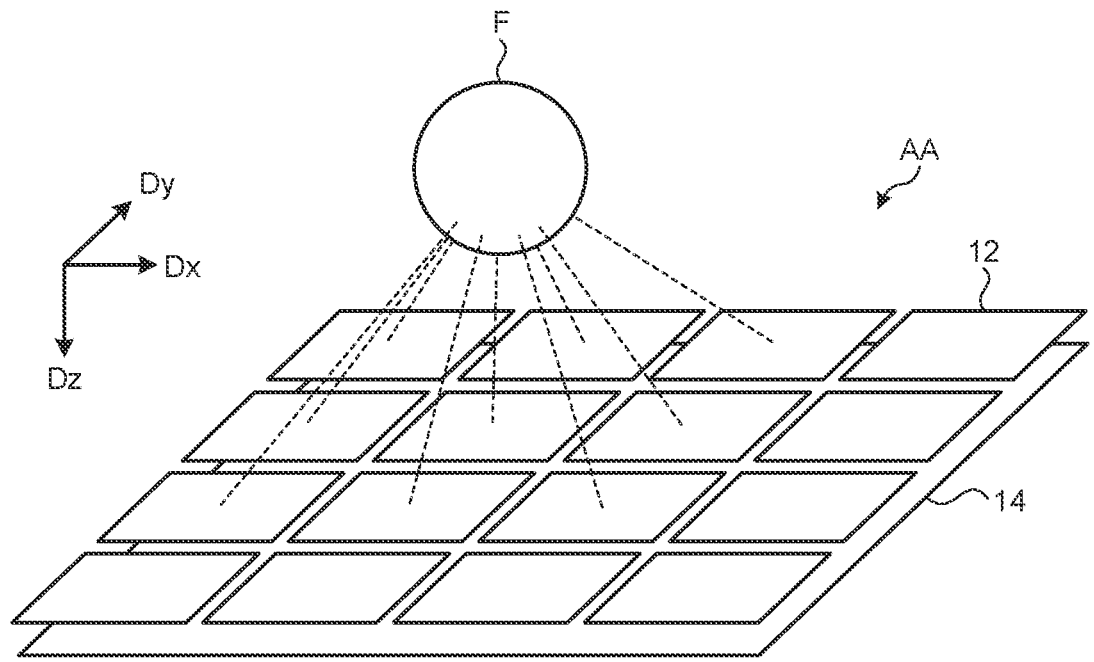
FIG. 4A is a schematic of the positional relation between the position of an object to be detected in a space on a detection region and each detection electrode.
Figure 4B:
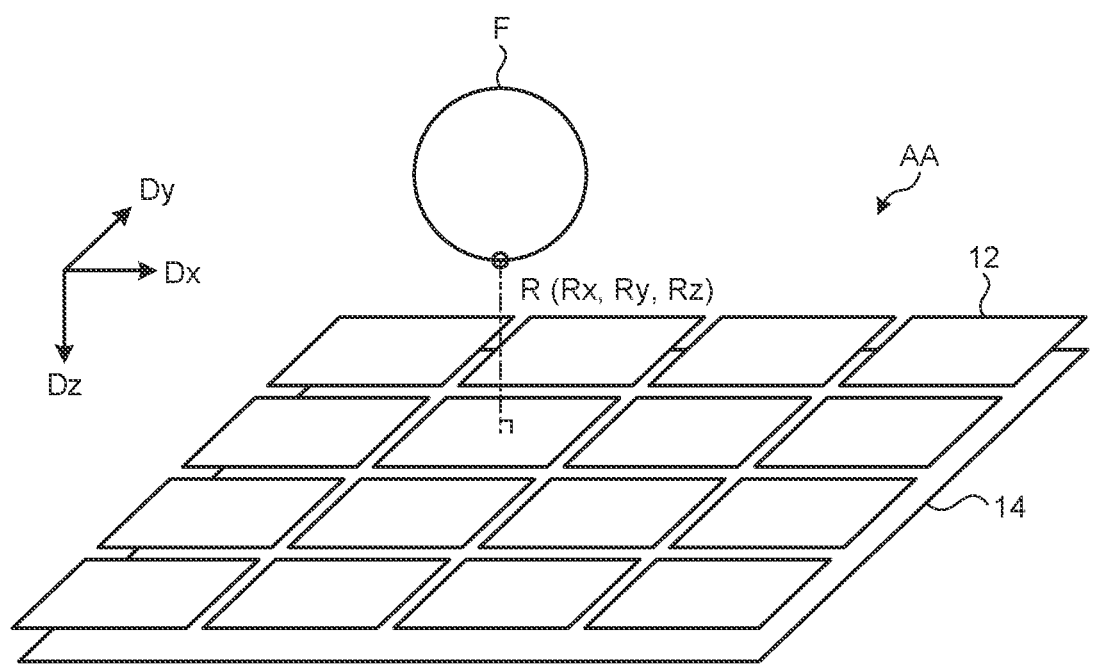
FIG. 4B is a schematic of the spatial coordinates of the object to be detected in the space on the detection region.

FIG. 4A is a schematic of the positional relation between the position of the object to be detected in a space on the detection region and each detection electrode. FIG. 4B is a schematic of the spatial coordinates of the object to be detected in the space on the detection region. FIGS. 4A and 4B illustrate an example where an object to be detected F is present in the space on the detection region AA.

As illustrated in FIG. 4A, each detection electrode 12 in the detection region AA has capacitance generated corresponding to the distance between the object to be detected F present in the space on the detection region AA and the detection electrode 12. The output value S(n) corresponding to the capacitance is acquired by the detection circuit 22.

The processing circuit 23 extracts the spatial coordinates R (Rx,Ry,Rz) indicating the position of the object to be detected F in the space on the detection region AA illustrated in FIG. 4B using the output value S(n) of each detection electrode 12 generated by the detection circuit 22.

In the present disclosure, the spatial coordinates R (Rx,Ry,Rz) correspond to the position of the object to be detected F present in the space on the detection region AA. The spatial coordinates R (Rx,Ry,Rz) include first data Rx in an X-direction corresponding to the position in the Dx direction (first direction) on the detection region AA, second data Ry in a Y-direction corresponding to the position in the Dy direction (second direction) on the detection region AA, and third data Rz in a Z-direction corresponding to the position in the Dz direction (third direction) orthogonal to the Dx direction (first direction) and the Dy direction (second direction).

The processing circuit 23 transmits the spatial coordinates R (Rx,Ry,Rz) calculated by the coordinate calculator 45 to the host device via the interface circuit 25 serving as a USB controller IC, for example. The host device performs control corresponding to the spatial coordinates R (Rx,Ry,Rz) transmitted from the processing circuit 23. The present disclosure is not limited by the processing on the host device.

FIG. 5 is a conceptual diagram of an example of the method for calculating the spatial coordinates of the object to be detected. In FIG. 5, the horizontal axis indicates the first data Rx in the X-direction of the spatial coordinates R (Rx,Ry,Rz) (corresponding to the position of the object to be detected F in the Dx direction in the detection region AA), and the vertical axis indicates the third data Rz in the Z-direction of the spatial coordinates R (Rx,Ry,Rz) (corresponding to the position of the object to be detected F in the Dz direction).

The calculated value represented by the solid line in FIG. 5 is obtained by interpolation using the detected value Vdet(n) of each detection electrode 12, for example. The method for calculating the calculated value illustrated in FIG. 5 is not limited to interpolation and may be approximation, for example.

In the present disclosure, the third data Rz in the Z-direction of the spatial coordinates R (Rx,Ry,Rz) satisfies "Rz=0" when the object to be detected F fails to be detected. In other words, the third data Rz in the Z-direction of the spatial coordinates R (Rx,Ry,Rz) takes a smaller value as the object to be detected F is farther away from the sensor unit 10 and a larger value as the object to be detected F is closer to the sensor unit 10.

Figure 6:
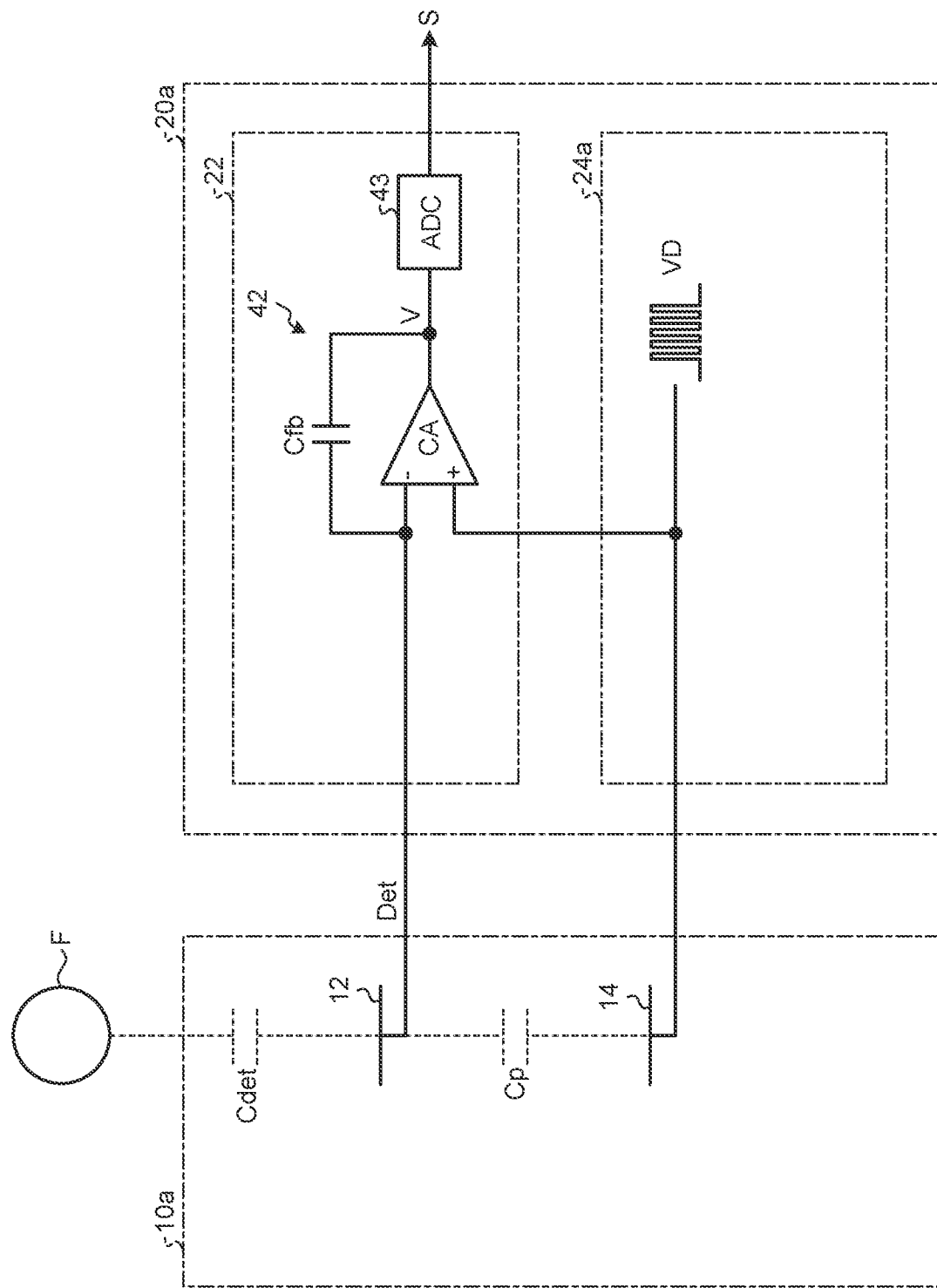
FIG. 6 is a diagram of an example of the coupling configuration between a sensor unit and the detector according to a comparative example.

FIG. 6 is a diagram of an example of the coupling configuration between the sensor unit and the detector according to a comparative example. FIG. 6 illustrates the configurations of a sensor unit 10a and a detector 20a corresponding to the configuration according to the embodiment, which will be described later.

In the comparative example illustrated in FIG. 6, the signal detector 42 of the detection circuit 22 includes a differential amplification circuit CA as a major component. The sensor unit 10a according to the comparative example illustrated in FIG. 6 does not include the peripheral electrodes 16 provided in the peripheral region GA of the sensor unit 10 according to the present disclosure.

A non-inverting input terminal of the differential amplification circuit CA is supplied with a drive signal VD for detection from a power circuit 24a. The drive signal VD is a square wave signal that repeats high and low potentials in a predetermined cycle.

An inverting input terminal of the differential amplification circuit CA is coupled to the detection electrode 12 provided in the detection region AA. Negative feedback capacitance Cfb is provided between the inverting input terminal and an output terminal of the differential amplification circuit CA. The differential amplification circuit CA functions as an integration circuit by the drive signal VD being supplied to the non-inverting input terminal.

In the comparative example illustrated in FIG. 6, the shield electrode 14 is supplied with the drive signal VD from the power circuit 24a.

As described above, the detecting device 1 according to the present disclosure is configured to detect the spatial coordinates indicating the position of the object to be detected F positioned on the detection region AA by detecting the capacitance generated in each detection electrode 12. Therefore, it is necessary to enhance the detection sensitivity compared to a configuration that detects the plane coordinates of the object to be detected F in contact with the detection surface. As a result, the detecting device 1 is more likely to be affected by parasitic capacitance Cp generated between the detection electrodes 12 and a conductor, such as the shield electrode 14. The output value S obtained in the detection operation is expressed by the following Expression (1) where S(Cdet) is a component due to capacitance Cdet generated between the object to be detected F and the detection electrode 12, and S(Cp) is a component due to the parasitic capacitance Cp.

$$S=S(Cdet)+S(Cp) \qquad (1)$$

The configuration according to the comparative example defines in advance the parasitic capacitance component S(Cp) obtained when the object to be detected F is not present in the space where an external proximity object can be detected on the detection region AA as a detection reference value BL. The configuration according to the comparative example calculates the detected value Vdet from which the parasitic capacitance component is removed by subtracting the detection reference value BL from the output value S of the detection electrode 12 obtained in the detection operation. The detected value Vdet is expressed by the following Expression (2).

$$Vdet=S-BL \qquad (2)$$

Figure 7A:
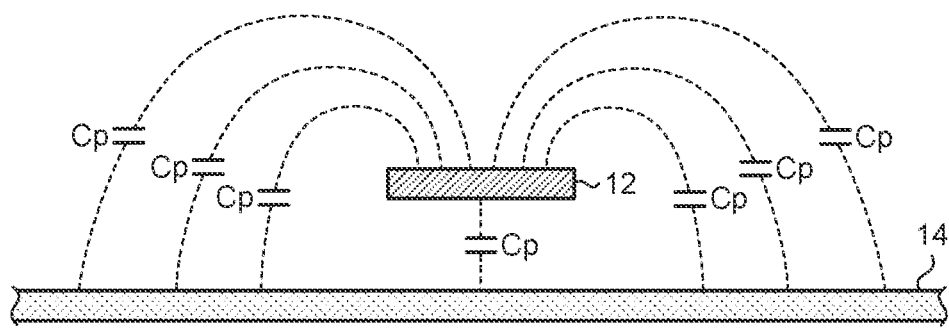
FIG. 7A is a first conceptual diagram of capacitance generated in the detection electrode.
Figure 7B:
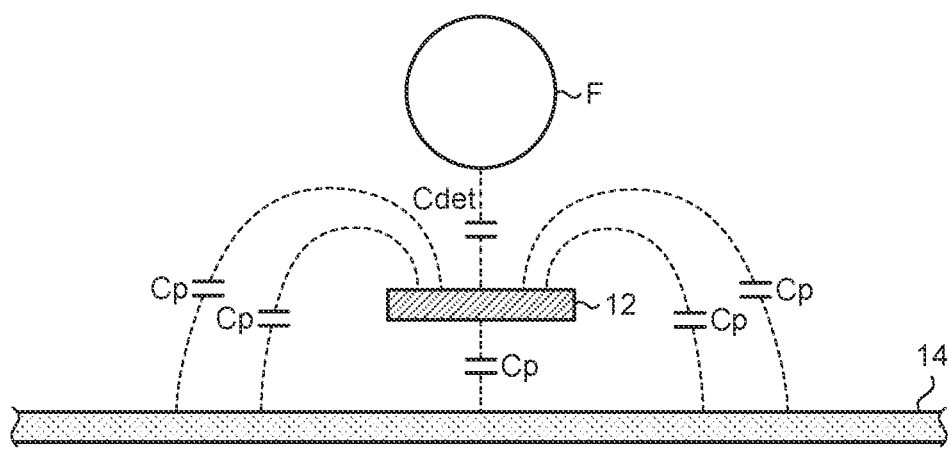
FIG. 7B is another first conceptual diagram of the capacitance generated in the detection electrode.

FIGS. 7A and 7B are first conceptual diagrams of the capacitance generated in the detection electrode. FIG. 7A illustrates the parasitic capacitance Cp generated in the detection electrode 12 when no detectable object to be detected F is present. FIG. 7B illustrates the capacitance Cdet and the parasitic capacitance Cp generated in the detection electrode 12 when the object to be detected F is present on the detection electrode 12. FIGS. 7A and 7B illustrate the parasitic capacitance Cp generated between the detection electrode 12 and the shield electrode 14 along the lines of electric force conceptually represented by the dashed lines.

When the object to be detected F is present on the detection electrode 12 as illustrated in FIG. 7B, the object to be detected F blocks the lines of electric force output from the upper part of the detection electrode 12, thereby reducing the total amount of parasitic capacitance Cp. Therefore, the detection reference value BL obtained when the object to be detected F is not present is larger than the parasitic capacitance component S(Cp) included in the output value S obtained when the object to be detected F is present on the detection electrode 12.

Figure 8A:
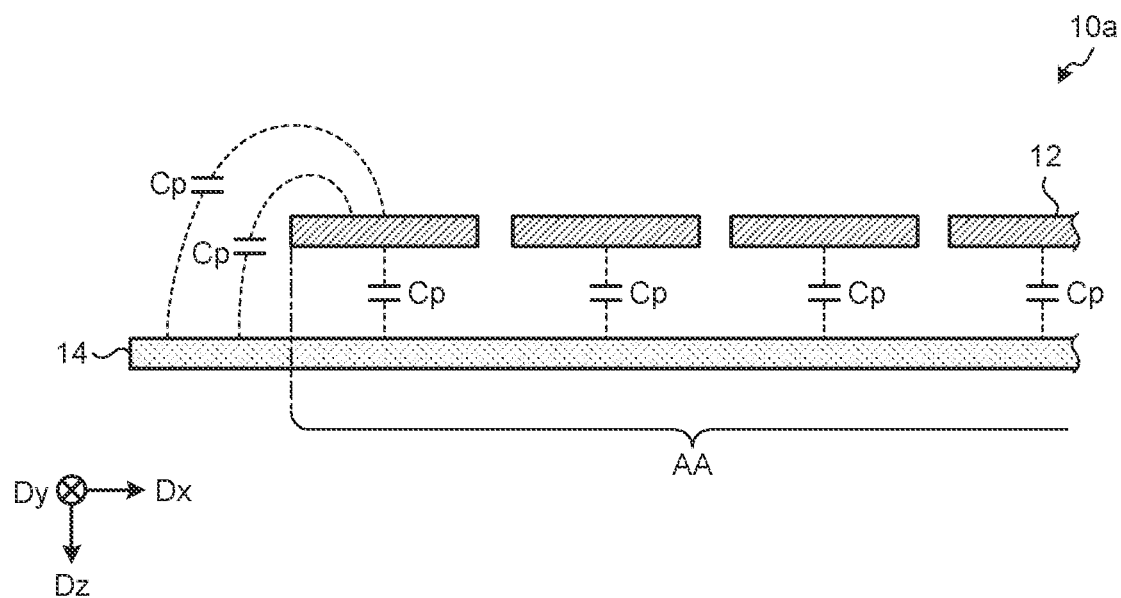
FIG. 8A is a second conceptual diagram of the capacitance generated in the detection electrodes.
Figure 8B:
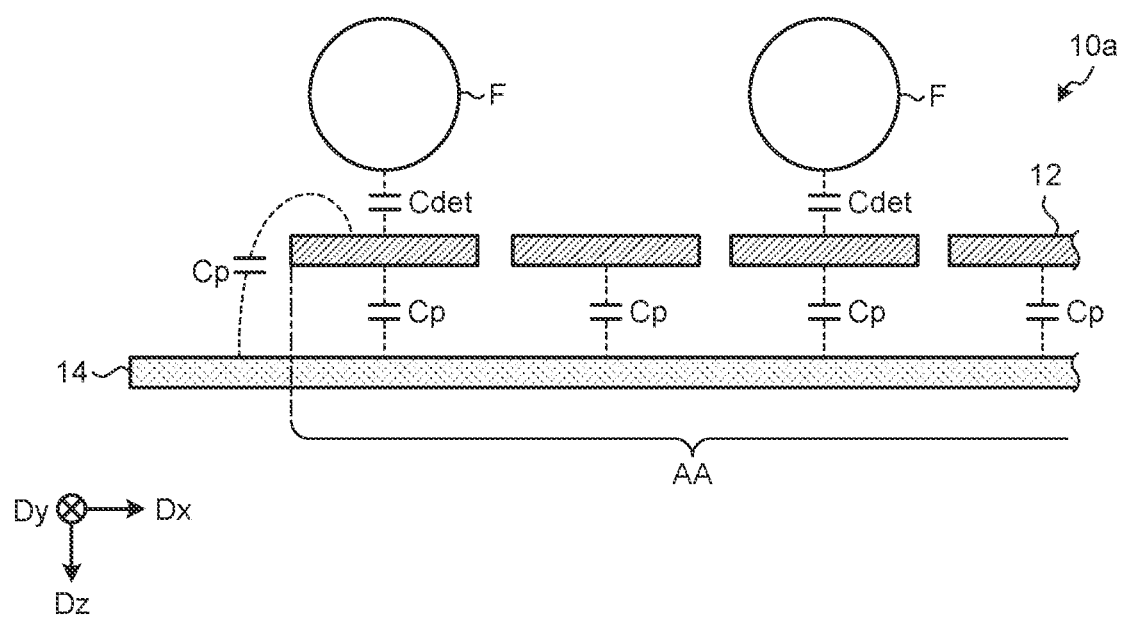
FIG. 8B is another second conceptual diagram of the capacitance generated in the detection electrodes.

FIGS. 8A and 8B are second conceptual diagrams of the capacitance generated in the detection electrodes. FIG. 8A illustrates the parasitic capacitance Cp generated in each detection electrode 12 when the object to be detected F is not present in the space where an external proximity object can be detected on the detection region AA. FIG. 8B illustrates the capacitance Cdet and the parasitic capacitance Cp generated in each detection electrode 12 when the object to be detected F is present in the space where an external proximity object can be detected on the detection region AA. FIGS. 8A and 8B illustrate the sensor unit 10a according to the comparative example illustrated in FIG. 6, and the sensor unit 10a does not include the peripheral electrodes 16 provided in the peripheral region GA of the sensor unit 10 according to the present disclosure.

The number of lines of electric force output from the upper part of the detection electrode 12 is larger as the detection electrode 12 is closer to the end of the detection region AA and smaller as it is farther away from the end of the detection region AA. Therefore, the total amount of parasitic capacitance Cp generated in the detection electrode 12 is larger as the detection electrode 12 is closer to the end of the detection region AA and smaller as it is farther away from the end of the detection region AA. In other words, the detection reference value BL obtained when the object to be detected F is not present and the parasitic capacitance component S(Cp) included in the output value S obtained when the object to be detected F is present on the detection electrode 12 are larger as the detection electrode 12 is closer to the end of the detection region AA and smaller as it is farther away from the end of the detection region AA.

The number of lines of electric force blocked by the object to be detected F when the object to be detected F is present on the detection electrode 12 is larger as the detection electrode 12 is closer to the end of the detection region AA. Accordingly, the difference between the detection reference value BL obtained when the object to be detected F is not present and the parasitic capacitance component S(Cp) included in the output value S obtained when the object to be detected F is present on the detection electrode 12 in the detection operation is larger as the detection electrode 12 is closer to the end of the detection region AA.

Figure 9:
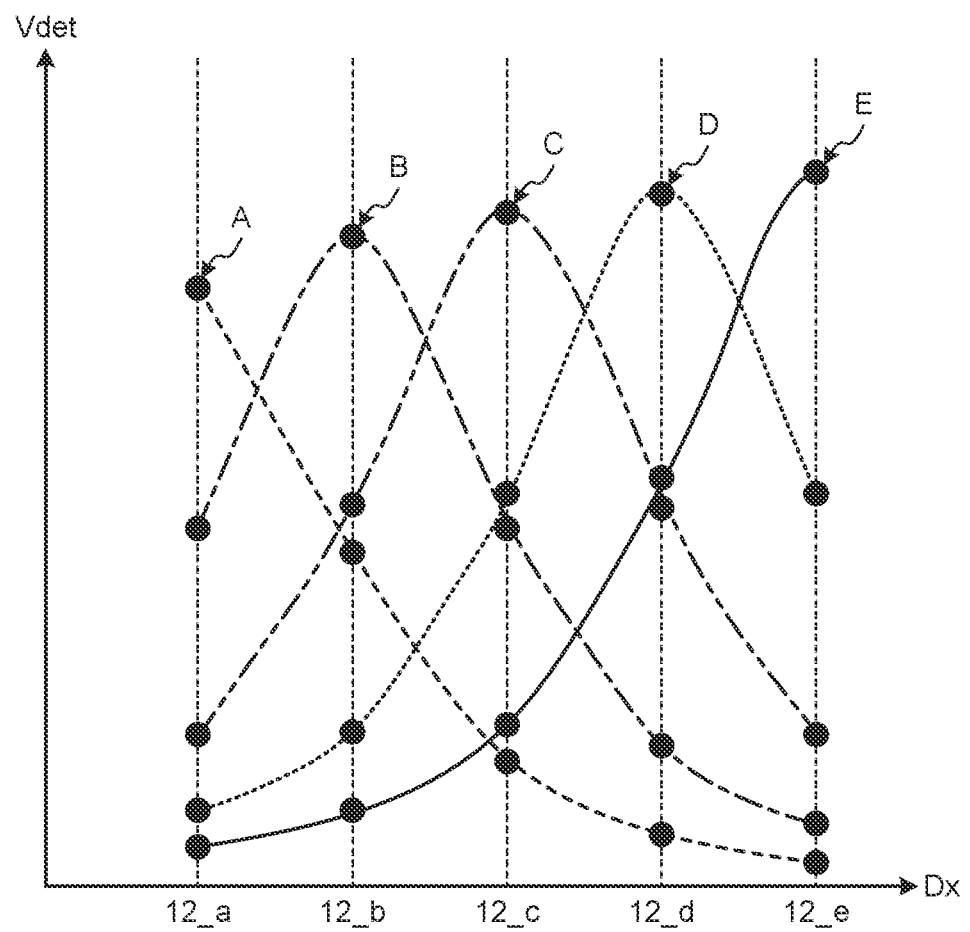
FIG. 9 is a diagram of an example of detected values according to the comparative example.

FIG. 9 is a diagram of an example of the detected values according to the comparative example. In FIG. 9, the vertical axis indicates the detected value Vdet, and the horizontal axis indicates the position of the detection electrode 12 in the Dx direction. FIG. 9 illustrates an example obtained by plotting the detected values of detection electrodes 12_a, 12_b, 12_c, 12_d, and 12_e when the object to be detected F is present at the same height directly on points A, B, C, D, and E illustrated in FIG. 1 in the Dz direction.

In the comparative example, the difference between the detection reference value BL and the parasitic capacitance component S(Cp) included in the output value S obtained in the detection operation is larger as the detection electrode 12 is closer to the end of the detection region AA as described above. Therefore, the detected value Vdet calculated by Expression (2) is smaller as the position of the detection electrode 12 is closer to the end of the detection region AA as illustrated in FIG. 9. As a result, the error in calculating the spatial coordinates R (Rx,Ry,Rz) by the coordinate calculator 45 at the subsequent stage may possibly increase, thereby reducing the accuracy of detecting the position of the object to be detected F in the space on the detection region AA.

The following describes the configuration and the method that can improve the accuracy of detecting the position of the object to be detected F in the space on the detection region AA.

Figure 10:
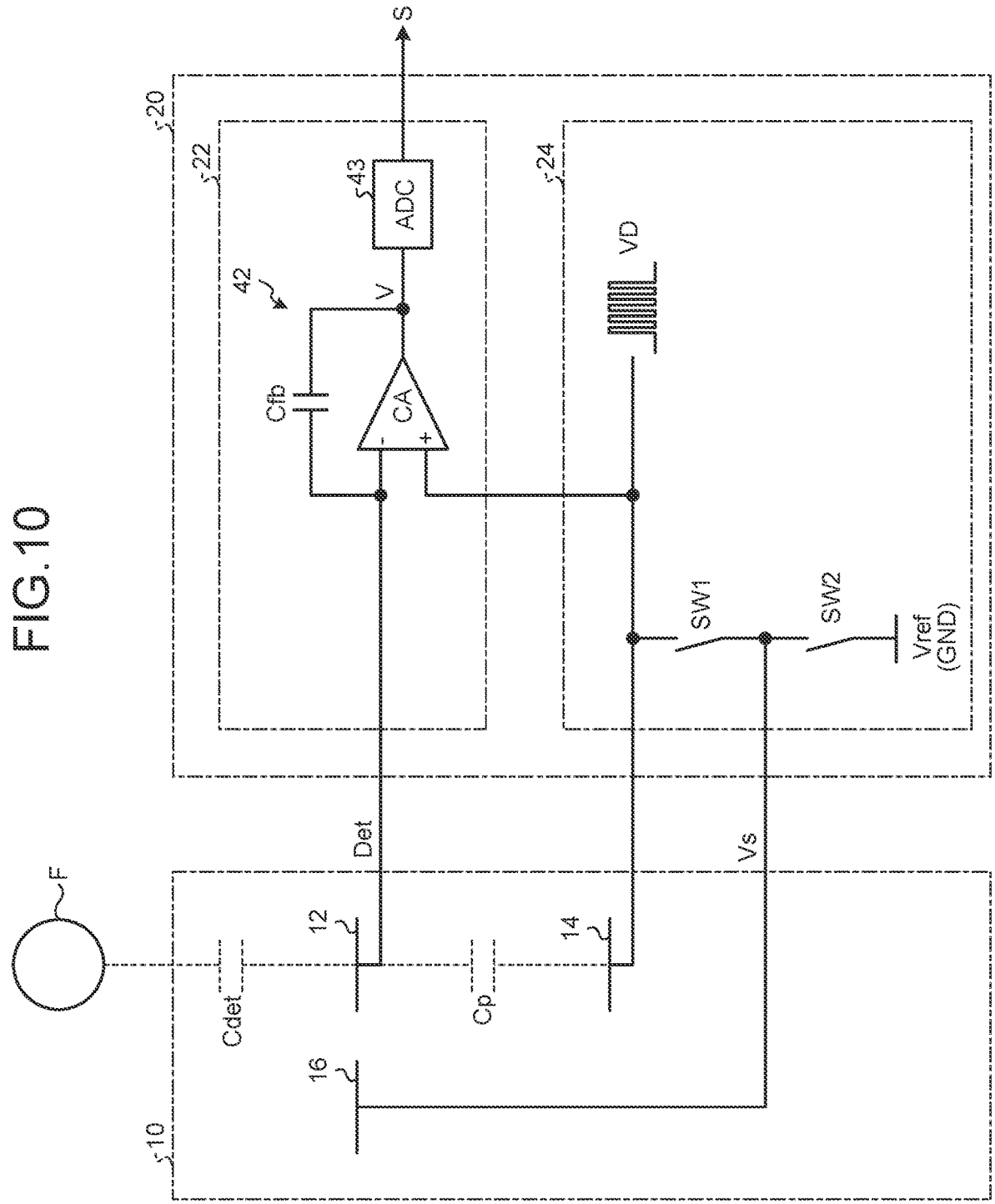
FIG. 10 is a diagram of an example of the coupling configuration between the sensor unit and the detector according to the embodiment.
Figure 11:
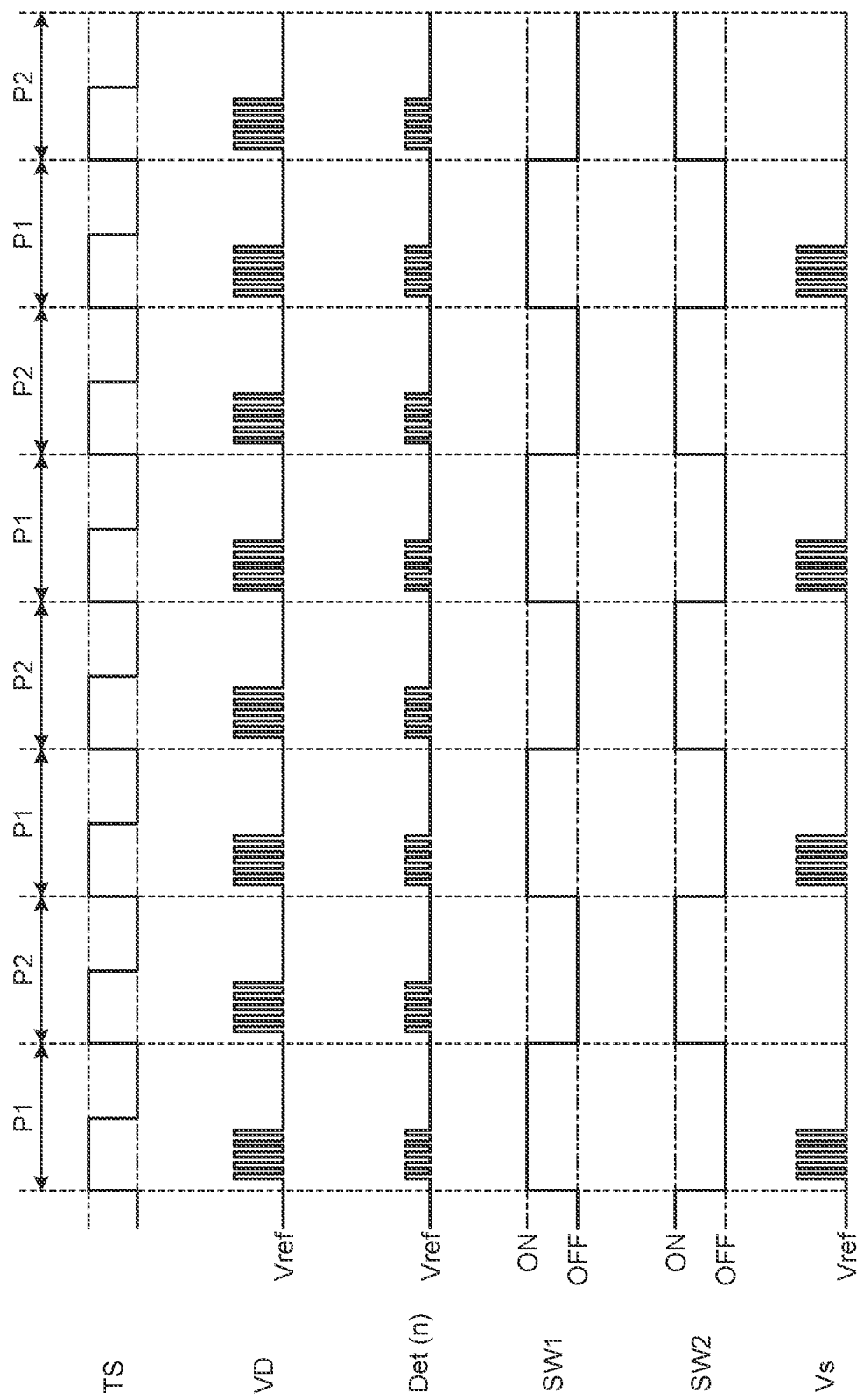
FIG. 11 is a timing chart of an example of detection timings in a detection circuit.

FIG. 10 is a diagram of an example of the coupling configuration between the sensor unit and the detector according to the embodiment. FIG. 11 is a timing chart of an example of detection timings in the detection circuit. The same components as those according to the comparative example illustrated in FIG. 6 are denoted by like reference numerals, and duplicate explanation may be omitted.

In the configuration according to the embodiment illustrated in FIG. 10, the drive signal VD or a reference potential Vref is selectively supplied to the peripheral electrode 16 from the power circuit 24. Specifically, the drive signal VD is supplied as a voltage signal Vs to the peripheral electrode 16 from the power circuit 24 in a first period P1 when a switch SW1 is turned on and a switch SW2 is turned off, and the reference potential Vref is supplied as the voltage signal Vs to the peripheral electrode 16 from the power circuit 24 in a second period P2 when the switch SW1 is turned off and the switch SW2 is turned on. The reference potential Vref is a GND potential, for example.

Figure 12:
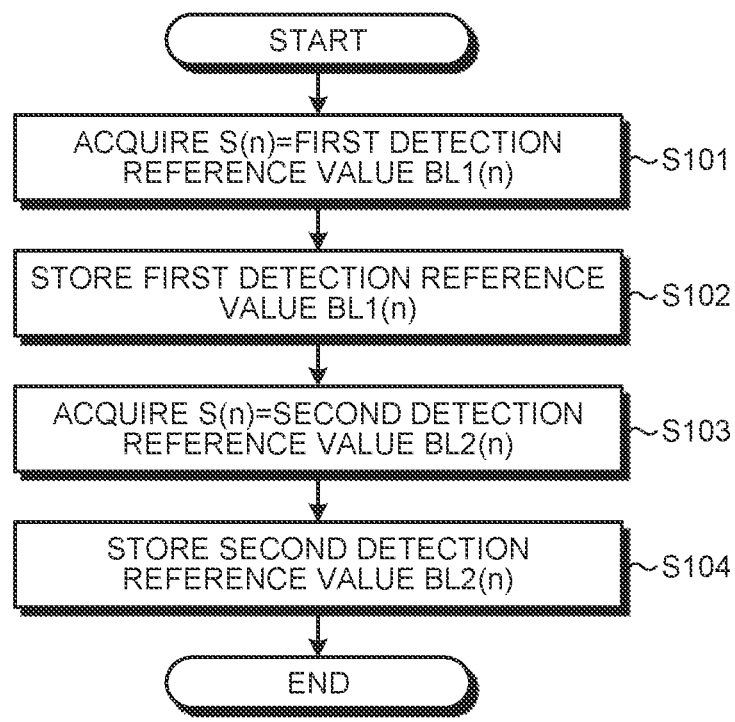
FIG. 12 is a flowchart of an example of a detection reference value acquisition process according to the embodiment.

FIG. 12 is a flowchart of an example of the detection reference value acquisition process according to the embodiment. The detection reference value acquisition process illustrated in FIG. 12 is performed at the startup of the detecting device 1, for example.

The signal processor 44 of the processing circuit 23 acquires the output value S(n) of each detection electrode 12 as a first detection reference value BL1($n$) in the first period P1 when the drive signal VD is supplied as the voltage signal Vs to the peripheral electrode 16 (Step S101). The acquired first detection reference value BL1($n$) is stored in the storage unit 46 (Step S102).

Subsequently, the signal processor 44 acquires the output value S(n) of each detection electrode 12 as a second detection reference value BL2($n$) in the second period P2 when the reference potential Vref is supplied as the voltage signal Vs to the peripheral electrode 16 (Step S103). The acquired second detection reference value BL2($n$) is stored in the storage unit 46 (Step S104).

The signal processor 44 may acquire the second detection reference value BL2($n$) (Steps S103 and S104) before acquiring the first detection reference value BL1($n$) (Steps S101 and S102). The present disclosure is not limited by the order of acquisition of the first detection reference value BL1($n$) and the second detection reference value BL2($n$).

By the detection reference value acquisition process described above, the signal processor 44 acquires the first detection reference value BL1($n$) and the second detection reference value BL2($n$) used in the detected value calculation process performed in the detection operation, which will be described later.

First Embodiment

Figure 13:
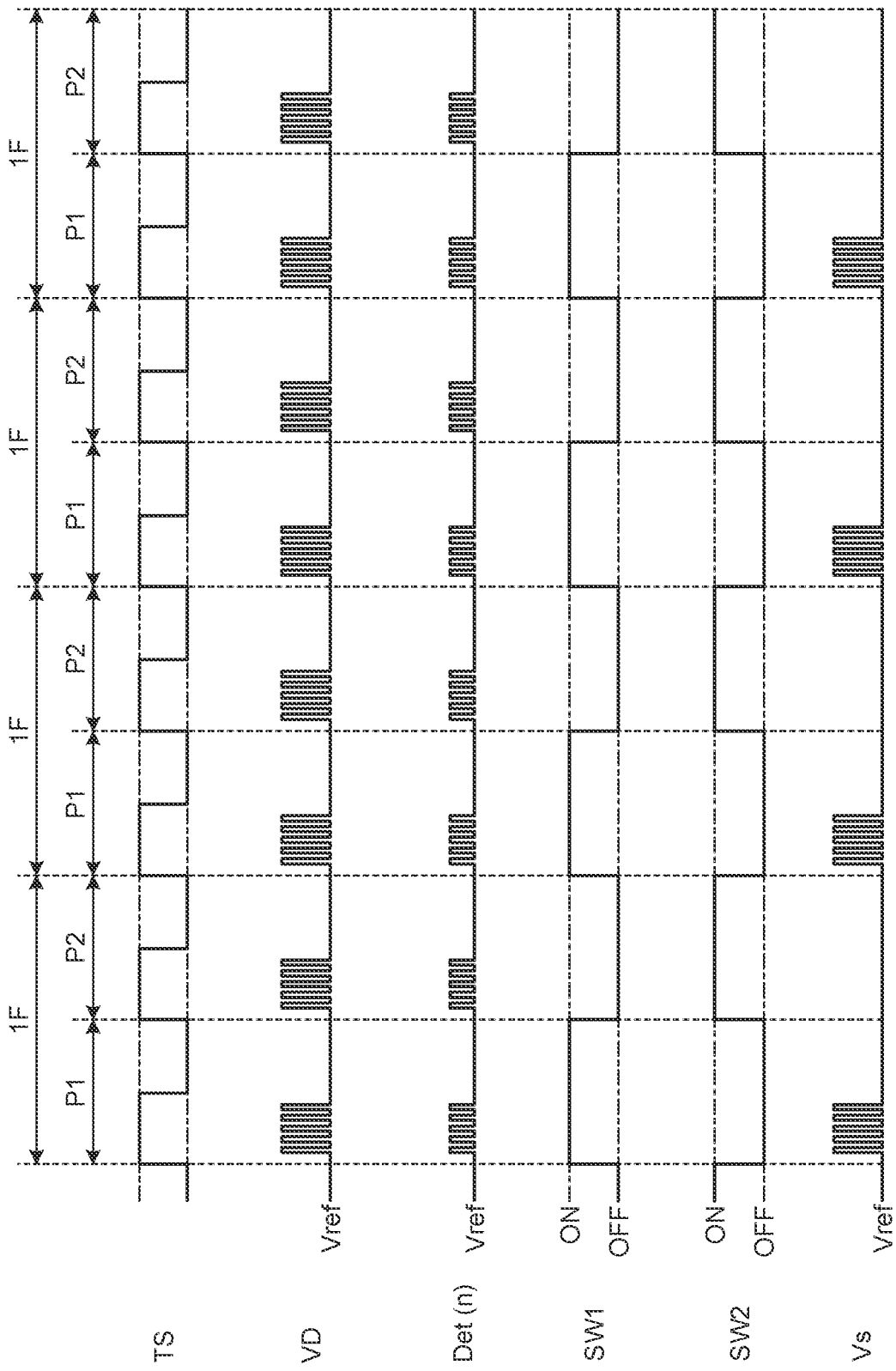
FIG. 13 is a timing chart of an example of the detection timings in a detection operation according to a first embodiment.
Figure 14:
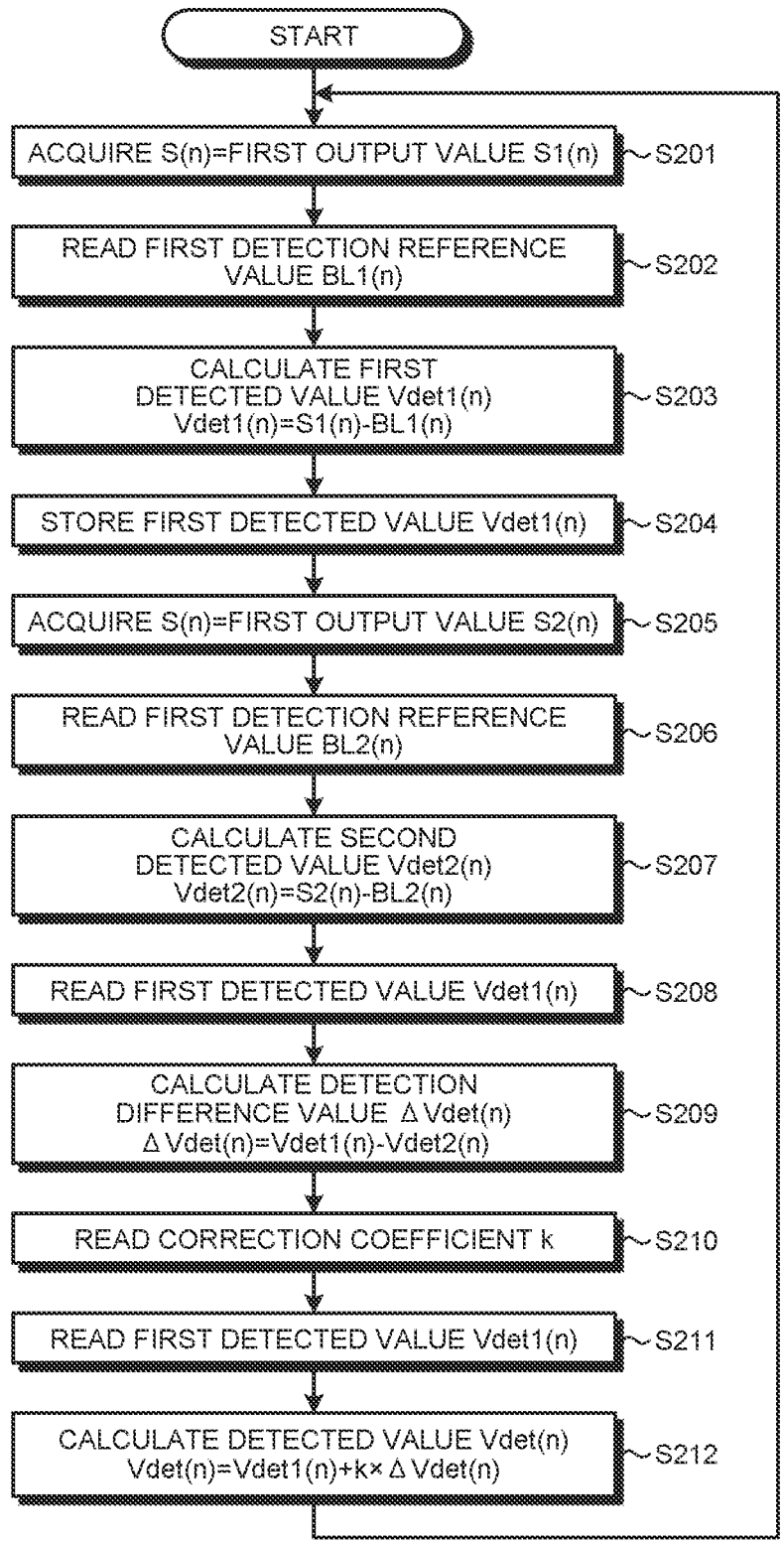
FIG. 14 is a flowchart of an example of a detected value calculation process according to the first embodiment.

FIG. 13 is a timing chart of an example of the detection timings in the detection operation according to a first embodiment. FIG. 14 is a flowchart of an example of the detected value calculation process according to the first embodiment.

In the first embodiment, the detected value Vdet is calculated in each frame (1F) including the first period P1 when the drive signal VD is supplied to the peripheral electrode 16 and the second period P2 when the reference potential Vref is supplied to the peripheral electrode 16.

The signal processor 44 of the processing circuit 23 acquires the output value S(n) of each detection electrode 12 as a first output value S1($n$) in the first period P1 when the drive signal VD is supplied as the voltage signal Vs to the peripheral electrode 16 (Step S201).

The signal processor 44 reads the first detection reference value BL1($n$) from the storage unit 46 (Step S202) and calculates a first detected value Vdet1($n$) by subtracting the first detection reference value BL1($n$) from the first output value S1($n$) acquired at Step S201 (Step S203). The calculated first detected value Vdet1($n$) is temporarily stored in the storage unit 46 (Step S204). The first detected value Vdet1($n$) is expressed by the following Expression (3).

$$V\text{det}1(n)=S1(n)-BL1(n) \quad (3)$$

Subsequently, the signal processor 44 acquires the output value S(n) of each detection electrode 12 as a second output value S2($n$) in the second period P2 when the reference potential Vref is supplied to the peripheral electrode 16 (Step S205).

The signal processor 44 reads the second detection reference value BL2($n$) from the storage unit 46 (Step S206) and calculates a second detected value Vdet2($n$) by subtracting the second detection reference value BL2($n$) from the second output value S2($n$) acquired at Step S205 (Step S207). The second detected value Vdet2($n$) is expressed by the following Expression (4).

$$V\text{det}2(n)=S2(n)-BL2(n) \quad (4)$$

Subsequently, the signal processor 44 reads the first detected value Vdet1($n$) temporarily stored in the storage unit 46 at Step S204 from the storage unit 46 (Step S208). The signal processor 44 calculates a detection difference value ΔVdet(n) by subtracting the second detected value Vdet2($n$) calculated at Step S207 from the read first detected value Vdet1($n$) (Step S209). The detection difference value ΔVdet(n) is expressed by the following Expression (5).

$$\Delta V\text{det}(n)=V\text{det}1(n)-V\text{det}2(n) \quad (5)$$

Figure 15:
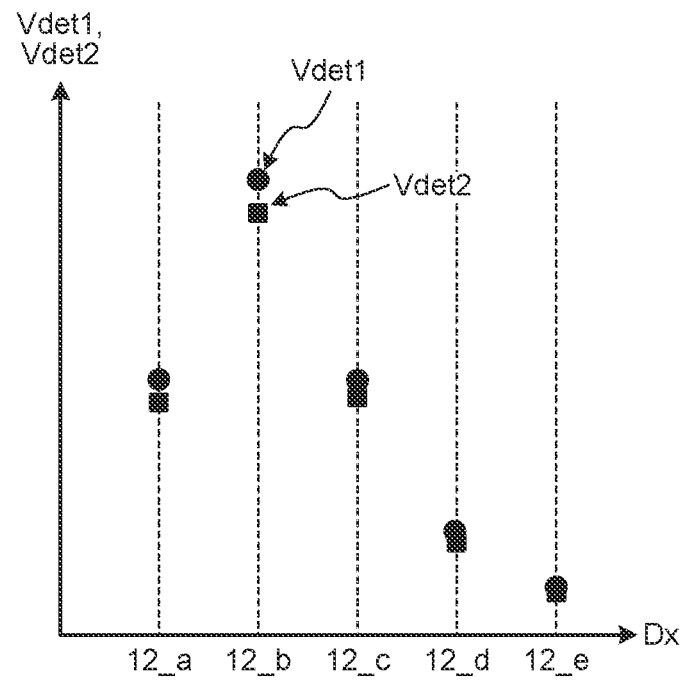
FIG. 15 is a diagram of an example of a first detected value and a second detected value.
Figure 16:
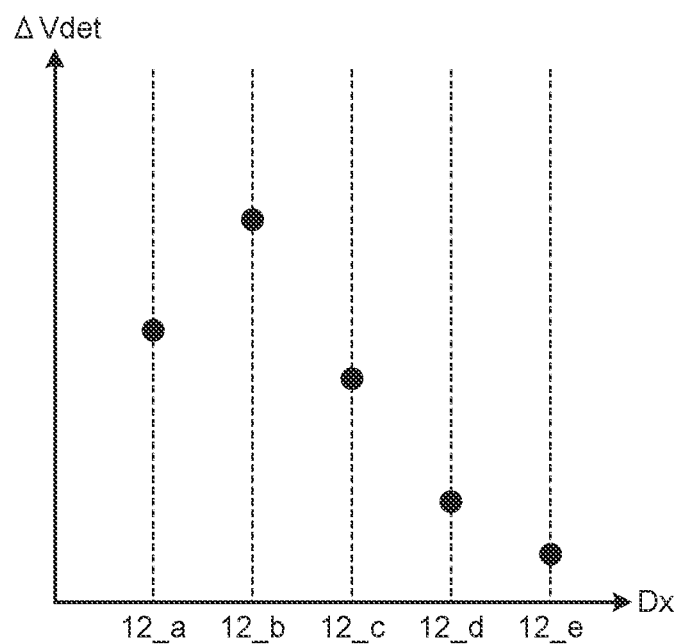
FIG. 16 is a diagram of an example of a detection difference value.

FIG. 15 is a diagram of an example of the first detected value and the second detected value. FIG. 16 is a diagram of an example of the detection difference value. In FIG. 15, the vertical axis indicates the first detected value Vdet1 and the second detected value Vdet2, and the horizontal axis indicates the position of the detection electrode 12 in the Dx direction. FIG. 15 illustrates an example obtained by plotting the first detected value and the second detected value of the detection electrodes 12_$a$, 12_$b$, 12_$c$, 12_$d$, and 12_$e$ when the object to be detected F is present directly on the point B illustrated in FIG. 1 in the Dz direction. In FIG. 16, the vertical axis indicates the detection difference value ΔVdet, and the horizontal axis indicates the position of the detection electrode 12 in the Dx direction. FIG. 16 illustrates an example obtained by plotting the detection difference value ΔVdet at the detection electrodes 12_$a$, 12_$b$, 12_$c$, 12_$d$, and 12_$e$.

The signal processor 44 reads a correction coefficient k corresponding to the detection difference value ΔVdet(n) calculated at Step S209 from the correction coefficient function stored in advance in the storage unit 46 (Step S210). The signal processor 44 reads the first detected value Vdet1($n$) temporarily stored in the storage unit 46 at Step S204 from the storage unit 46 (Step S211). The signal processor 44 multiplies the detection difference value ΔVdet (n) by the correction coefficient k to calculate a correction value k×ΔVdet(n) and adds the correction value k×ΔVdet(n) to the first detected value Vdet1($n$) to calculate the detected value Vdet(n) of each detection electrode 12 (Step S212). The signal processor 44 outputs the calculated detected value Vdet(n) to the coordinate calculator 45 at the subsequent stage. The detected value Vdet(n) is expressed by the following Expression (6).

$$V\text{det}(n)=V\text{det}1(n)+k\times\Delta V\text{det}(n) \quad (6)$$

Subsequently, the signal processor 44 performs the processing at Step S201 again and repeatedly performs the detected value calculation process described above.

Figure 17:
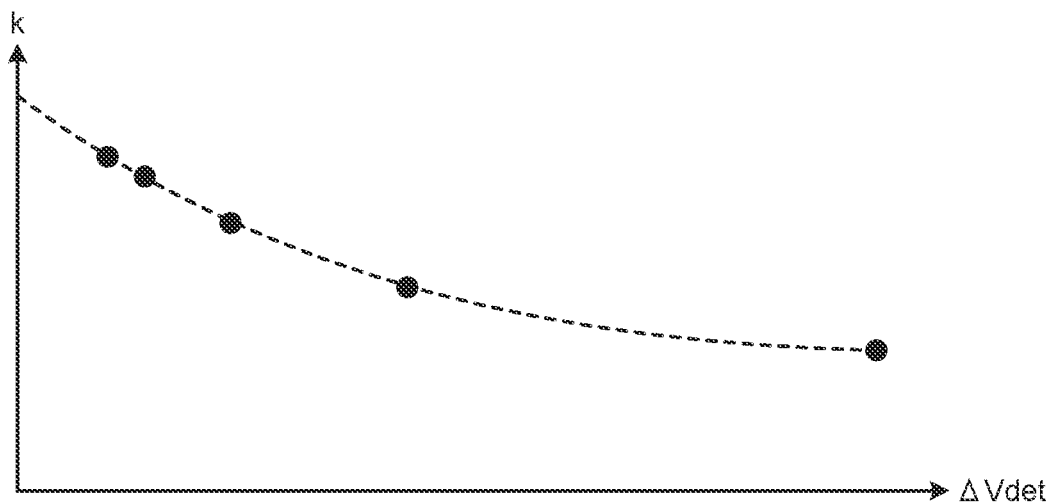
FIG. 17 is a diagram of an example of a correction coefficient function.
Figure 18:
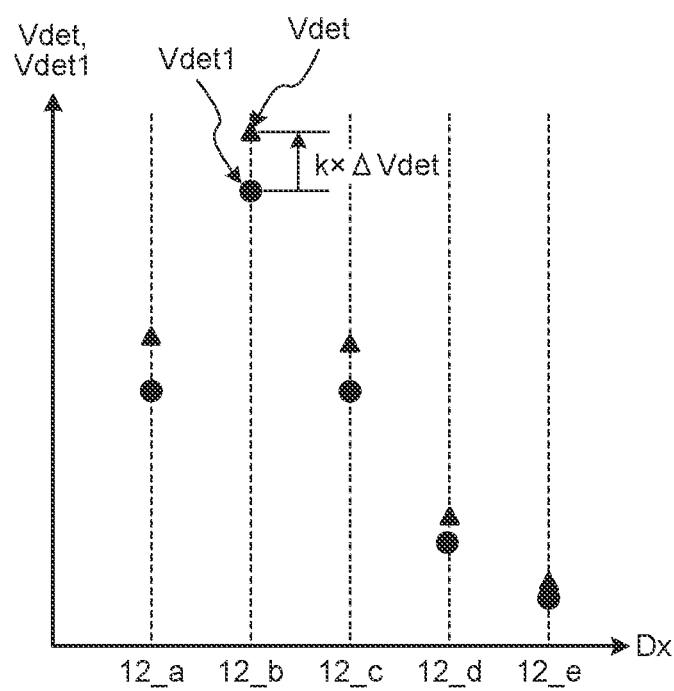
FIG. 18 is a first diagram of an example of the detected values after the detected value calculation process is performed.

FIG. 17 is a diagram of an example of the correction coefficient function. FIG. 18 is a first diagram of an example of the detected values after the detected value calculation process is performed. In FIG. 17, the vertical axis indicates the correction coefficient k, and the horizontal axis indicates the detection difference value ΔVdet. In FIG. 18, the vertical axis indicates the detected value Vdet and the first detected value Vdet1, and the horizontal axis indicates the position of the detection electrode 12 in the Dx direction. FIG. 18 illustrates an example obtained by plotting the detected value Vdet after correction and the first detected value Vdet1 before correction at the detection electrodes 12_a, 12_b, 12_c, 12_d, and 12_e.

Figure 19:
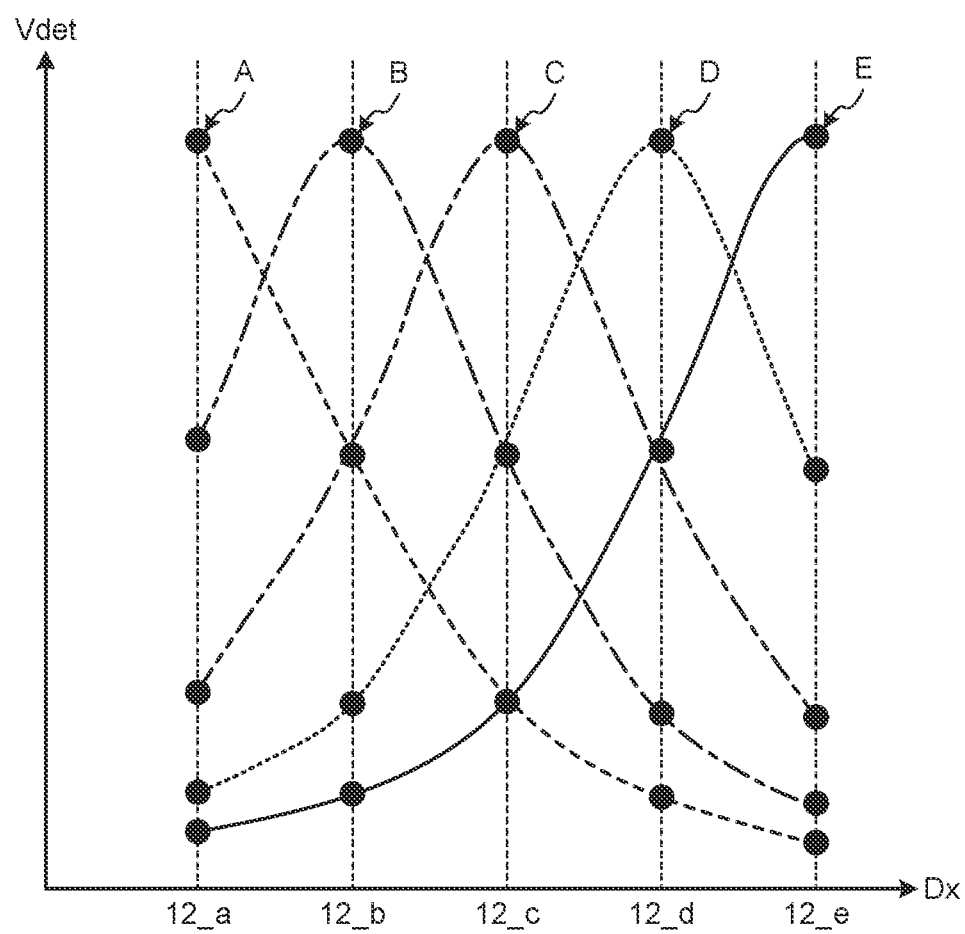
FIG. 19 is a second diagram of an example of the detected values after the detected value calculation process is performed.

FIG. 19 is a second diagram of an example of the detected values after the detected value calculation process is performed. In FIG. 19, the vertical axis indicates the detected value Vdet, and the horizontal axis indicates the position of the detection electrode 12 in the Dx direction. FIG. 19 illustrates an example obtained by plotting the detected values of detection electrodes 12_a, 12_b, 12_c, 12_d, and 12_e when the object to be detected F is present at the same height directly on points A, B, C, D, and E illustrated in FIG. 3 in the Dz direction.

The correction coefficient function illustrated in FIG. 17 is a function determined by the configuration of the sensor unit 10, such as the size of the detection electrode 12, the width of the peripheral electrode 16, the gap in the Dz direction between the detection electrode 12 and the shield electrode 14, and the arrangement of the various conductors constituting the detecting device 1.

By the detected value calculation process described above, the detected value Vdet is calculated by adding the value obtained by multiplying the detection difference value $\Delta$Vdet by the correction coefficient k to the first detected value Vdet1 obtained when the drive signal VD is supplied to the peripheral electrode 16 as illustrated in FIG. 18.

In the present disclosure, the correction coefficient k defined by the correction coefficient function illustrated in FIG. 17 is set such that the detected values Vdet of the detection electrodes 12 are substantially equivalent when the distances between the object to be detected F and the detection electrodes 12 are substantially equal. More specifically, the selected correction coefficient k is smaller as the detection difference value $\Delta$Vdet is larger. Therefore, the differences (individual differences) between the detected values due to the positions of the detection electrodes in the arrangement of the detection electrodes 12_a, 12_b, 12_c, 12_d, and 12_e (Dx direction) are evened out as illustrated in FIG. 19. As a result, a constant detected value Vdet is obtained when the distances between the object to be detected F and the detection electrodes 12 are substantially equal.

While the detection electrodes arrayed in the Dx direction are described above, the same applies to the detection electrodes arrayed in the Dy direction. Needless to say, a correction coefficient k' considering the effects of both the Dx direction and the Dy direction may be stored in the storage unit 46.

In the comparative example described above, the detected value Vdet is smaller as the position of the detection electrode 12 is closer to the end of the detection region AA as illustrated in FIG. 9. As a result, the error in calculating the spatial coordinates R (Rx,Ry,Rz) by the coordinate calculator 45 at the subsequent stage may possibly increase, thereby reducing the accuracy of detecting the position of the object to be detected F in the space on the detection region AA.

By contrast, in the detected value calculation process according to the first embodiment, a constant detected value Vdet is obtained regardless of the positions of the detection electrodes 12 in the Dx and Dy directions when the distances between the object to be detected F and the detection electrodes 12 are substantially equal as described above. This configuration can reduce the error in calculating the spatial coordinates R (Rx,Ry,Rz) by the coordinate calculator 45 at the subsequent stage, thereby suppressing reduction in accuracy of detecting the position of the object to be detected F in the space on the detection region AA.

Second Embodiment

Figure 20:
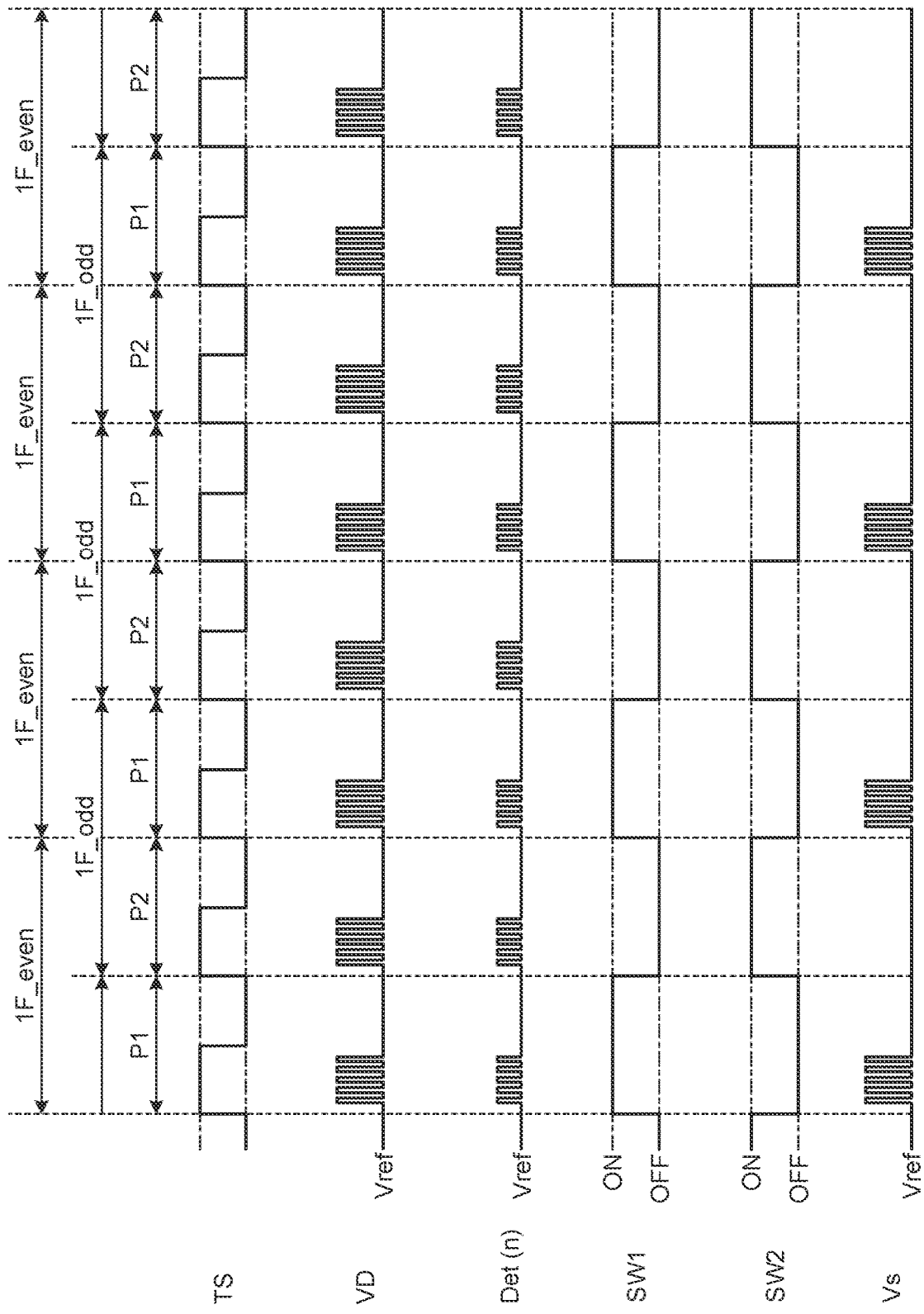
FIG. 20 is a timing chart of an example of the detection timings in the detection operation according to a second embodiment.
Figure 21:
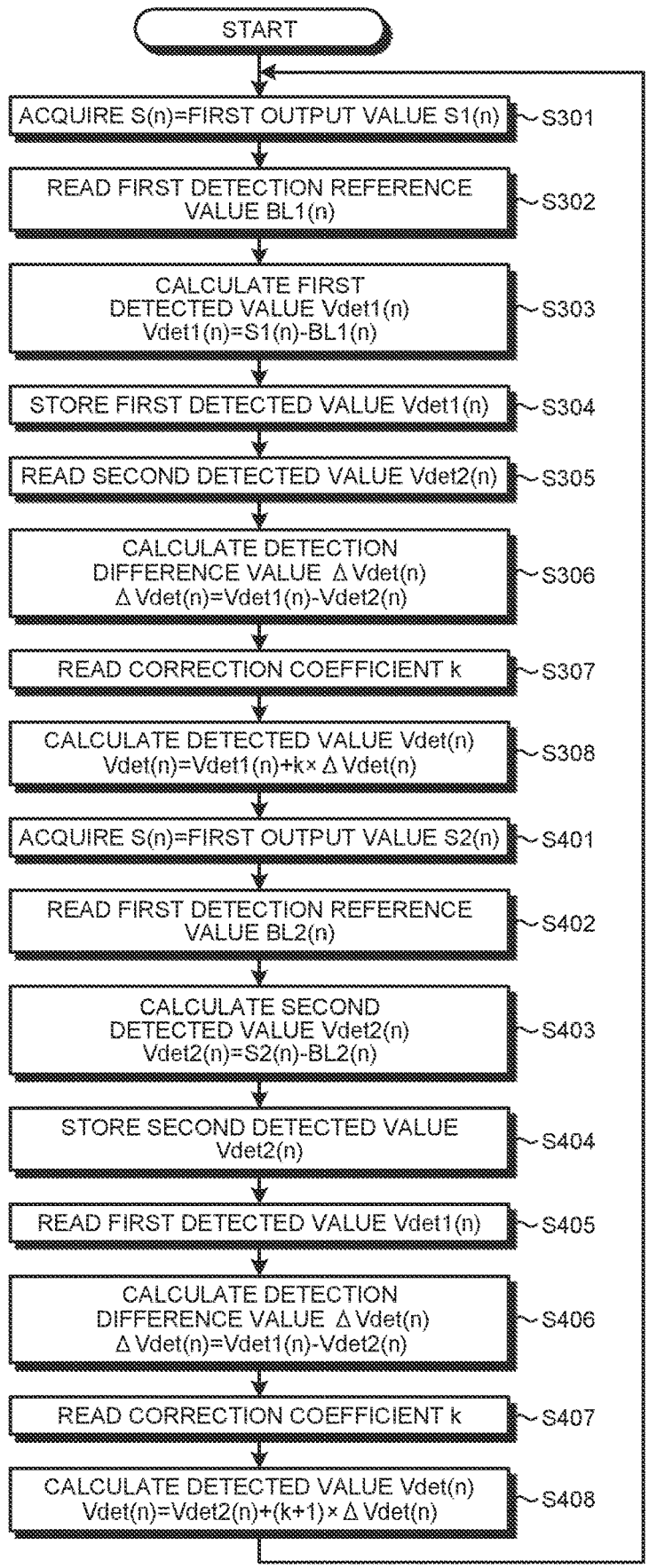
FIG. 21 is a flowchart of an example of the detected value calculation process according to the second embodiment.

FIG. 20 is a timing chart of an example of the detection timings in the detection operation according to a second embodiment. FIG. 21 is a flowchart of an example of the detected value calculation process according to the second embodiment.

The first embodiment describes the configuration that calculates the detected value Vdet by defining the first period P1 when the drive signal VD is supplied to the peripheral electrode 16 and the second period P2 when the reference potential Vref is supplied to the peripheral electrode 16 as one frame (1F) and using the first detected value Vdet1($n$) obtained in the first period P1 and the second detected value Vdet2($n$) obtained in the previous second period P2.

In the second embodiment, the second period P2 and the first period P1 following the second period P2 are defined as one frame (1F_odd). The detected value Vdet in one frame (1F_odd) is calculated using the second detected value Vdet2($n$) and the first detected value Vdet1($n$) obtained in the second period P2 of one frame (1F_odd) and in the first period P1 following the second period P2. The first period P1 and the second period P2 following the first period P1 are defined as one frame (1F_even). The detected value Vdet in one frame (1F_even) is calculated using the first detected value Vdet1($n$) and the second detected value Vdet2($n$) obtained in the first period P1 of one frame (1F_even) and in the second period P2 following the first period P1. As a result, the output frequency of the detected value Vdet is twice the output frequency according to the first embodiment.

The signal processor 44 of the processing circuit 23 acquires the output value S(n) of each detection electrode 12 as a first output value S1($n$) in the first period P1 when the drive signal VD is supplied as the voltage signal Vs to the peripheral electrode 16 (Step S301).

The signal processor 44 reads the first detection reference value BL1($n$) from the storage unit 46 (Step S302) and calculates a first detected value Vdet1($n$) by subtracting the first detection reference value BL1($n$) from the first output value S1($n$) acquired at Step S301 (Step S303). The calculated first detected value Vdet1($n$) is temporarily stored in the storage unit 46 (Step S304). The first detected value Vdet1($n$) is expressed by the following Expression (7).

$$V\text{det}1(n)=S1(n)-BL1(n) \tag{7}$$

Subsequently, the signal processor 44 reads the second detected value Vdet2($n$) temporarily stored in the storage unit 46 in the previous second period P2 from the storage unit 46 (Step S305). The signal processor 44 calculates the detection difference value $\Delta$Vdet(n) by subtracting the second detected value Vdet2($n$) read at Step S305 from the first detected value Vdet1($n$) calculated at Step S304 (Step S306). The detection difference value $\Delta$Vdet(n) is expressed by the following Expression (8).

$$\Delta V\text{det}(n)=V\text{det}1(n)-V\text{det}2(n) \tag{8}$$

The signal processor 44 reads the correction coefficient k corresponding to the detection difference value $\Delta$Vdet(n) calculated at Step S306 from the correction coefficient function stored in advance in the storage unit 46 (Step S307). The signal processor 44 multiplies the detection difference value ΔVdet(n) by the correction coefficient k to calculate the correction value k×ΔVdet(n) and adds the correction value k×ΔVdet(n) to the first detected value Vdet1(n) to calculate the detected value Vdet(n) of each detection electrode 12 (Step S308). The signal processor 44 outputs the calculated detected value Vdet(n) to the coordinate calculator 45 at the subsequent stage. The detected value Vdet(n) is expressed by the following Expression (9).

$$Vdet(n)=Vdet1(n)+k\times\Delta Vdet(n) \quad (9)$$

Subsequently, the signal processor 44 acquires the output value S(n) of each detection electrode 12 as a second output value S2(n) in the second period P2 when the reference potential Vref is supplied to the peripheral electrode 16 (Step S401).

The signal processor 44 reads the second detection reference value BL2(n) from the storage unit 46 (Step S402) and calculates a second detected value Vdet2(n) by subtracting the second detection reference value BL2(n) from the second output value S2(n) acquired at Step S401 (Step S403). The calculated second detected value Vdet2(n) is temporarily stored in the storage unit 46 (Step S404). The second detected value Vdet2(n) is expressed by the following Expression (10).

$$Vdet2(n)=S2(n)-BL2(n) \quad (10)$$

Subsequently, the signal processor 44 reads the first detected value Vdet1(n) temporarily stored in the storage unit 46 in the previous first period P1 from the storage unit 46 (Step S405). The signal processor 44 calculates the detection difference value ΔVdet(n) by subtracting the second detected value Vdet2(n) calculated at Step S404 from the first detected value Vdet1(n) read at Step S405 (Step S406). The detection difference value ΔVdet(n) is expressed by the following Expression (11).

$$\Delta Vdet(n)=Vdet1(n)-Vdet2(n) \quad (11)$$

The signal processor 44 reads the correction coefficient k corresponding to the detection difference value ΔVdet(n) calculated at Step S406 from the correction coefficient function stored in advance in the storage unit 46 (Step S407). The signal processor 44 multiplies the detection difference value ΔVdet(n) by a value obtained by adding 1 to the correction coefficient k to calculate a correction value (k+1)×ΔVdet(n) and adds the correction value (k+1)×ΔVdet(n) to the second detected value Vdet2(n) to calculate the detected value Vdet(n) of each detection electrode 12 (Step S408). The signal processor 44 outputs the calculated detected value Vdet(n) to the coordinate calculator 45 at the subsequent stage. The detected value Vdet(n) is expressed by the following Expression (12). Expression (12) can be derived using Expressions (9) and (11).

$$Vdet(n)=Vdet2(n)+(k+1)\times\Delta Vdet(n) \quad (12)$$

Subsequently, the signal processor 44 performs the processing at Step S301 again and repeatedly performs the detected value calculation process described above.

Also in the detected value calculation process according to the second embodiment, a constant detected value Vdet is obtained regardless of the positions of the detection electrodes 12 in the Dx and Dy directions when the distances between the object to be detected F and the detection electrodes 12 are substantially equal similarly to the detected value calculation process according to the first embodiment. This configuration can reduce the error in calculating the spatial coordinates R (Rx,Ry,Rz) by the coordinate calculator 45 at the subsequent stage similarly to the detected value calculation process according to the first embodiment. As a result, reduction in accuracy of detecting the position of the object to be detected F in the space on the detection region AA can be suppressed.

In the detected value calculation process according to the second embodiment, the second period P2 and the first period P1 following the second period P2 are defined as one frame (1F_odd). The detected value Vdet in one frame (1F_odd) is calculated using the second detected value Vdet2(n) and the first detected value Vdet1(n) obtained in the second period P2 of one frame (1F_odd) and in the first period P1 following the second period P2. The first period P1 and the second period P2 following the first period P1 are defined as one frame (1F_even). The detected value Vdet in one frame (1F_even) is calculated using the first detected value Vdet1(n) and the second detected value Vdet2(n) obtained in the first period P1 of one frame (1F_even) and in the second period P2 following the first period P1. As a result, the output frequency of the detected value Vdet is twice the output frequency according to the first embodiment.

In the embodiments described above, the reference potential Vref (e.g., GND potential) is supplied as the voltage signal Vs to the peripheral electrode 16 from the power circuit 24 in the second period P2 for calculating the second detected value Vdet2(n). Alternatively, an opposite-phase signal of the drive signal VD may be supplied as the voltage signal Vs to the peripheral electrode 16 from the power circuit 24 in the second period P2. This configuration can increase the value of the detection difference value ΔVdet(n) calculated by subtracting the second detected value Vdet2(n) from the first detected value Vdet1(n), thereby further reducing the error in calculating the spatial coordinates R (Rx, Ry,Rz) calculated by the coordinate calculator 45 at the subsequent stage. As a result, reduction in accuracy of detecting the position of the object to be detected F in the space on the detection region AA can be further suppressed.

Figure 23:
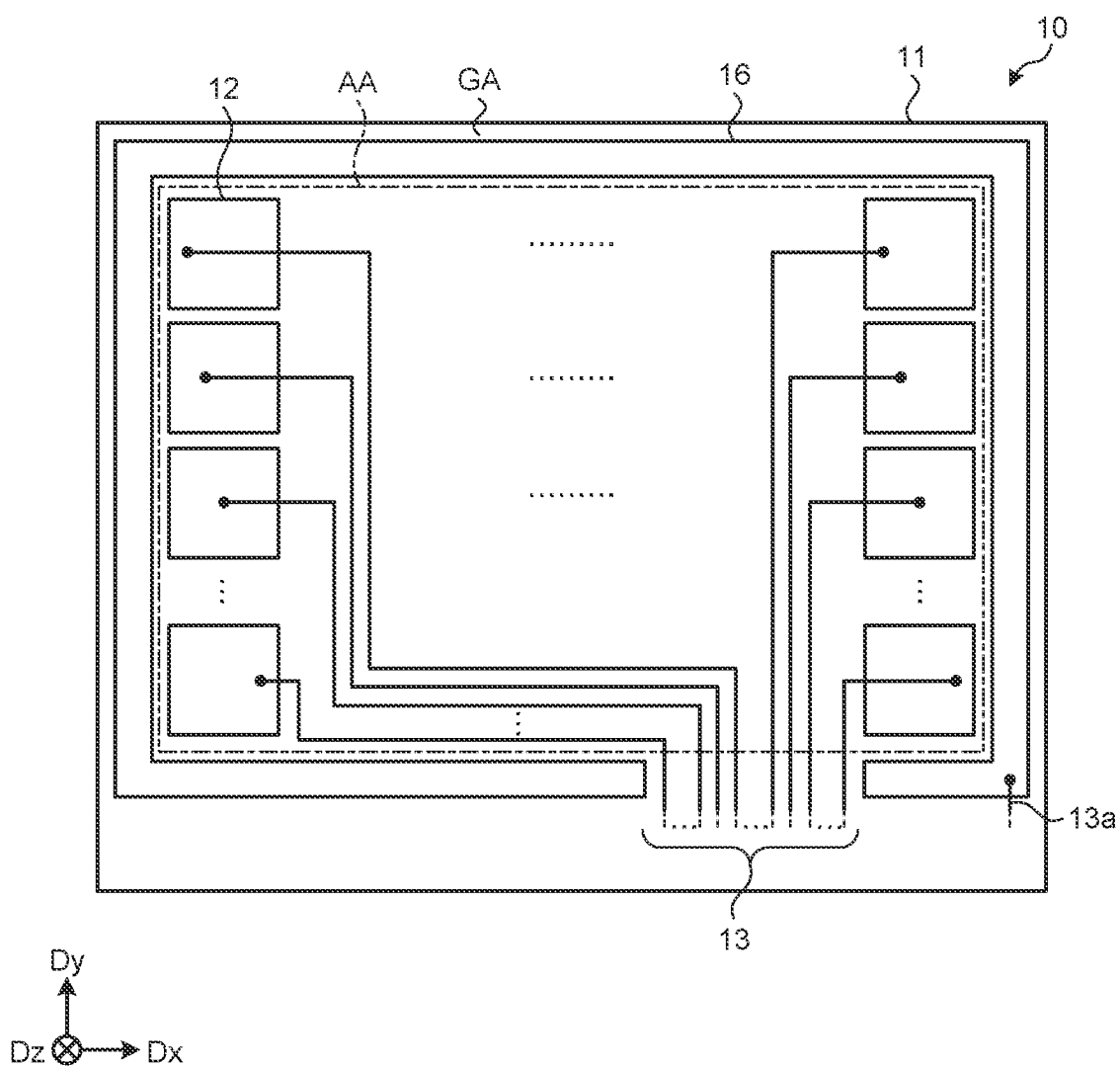
FIG. 23 is a plan view of a schematic configuration of the sensor unit according to a second modification.

In the embodiments described above, four peripheral electrodes 16 are provided along the respective sides of the detection region AA and are coupled by the pieces of wiring 13a. The shape of the peripheral electrodes 16 is not limited thereto. FIG. 22 is a plan view of a schematic configuration of the sensor unit according to a first modification. FIG. 23 is a plan view of a schematic configuration of the sensor unit according to a second modification. As illustrated in FIG. 22, one peripheral electrode 16 may be provided surrounding the outer periphery of the detection region AA, for example. Alternatively, as illustrated in FIG. 23, the peripheral electrode 16 may have a cutout through which the pieces of wiring 13 extending from the detection electrodes 12 pass.

While an exemplary embodiment according to the present disclosure has been described, the embodiment is not intended to limit the present disclosure. The contents disclosed in the embodiment are given by way of example only, and various modifications may be made without departing from the spirit of the present disclosure. Appropriate modifications made without departing from the spirit of the present disclosure naturally fall within the technical scope of the present disclosure.

What is claimed is:
1. A detecting device comprising:
a sensor unit having a detection region in which a plurality of detection electrodes are arrayed; and
a detector configured to supply a drive signal to the detection electrodes and detect a position of an object to be detected in a space on the detection region based on an output value of each of the detection electrodes, wherein the sensor unit comprises a peripheral electrode provided along an outer periphery of the detection region, the detector calculates a first detected value based on the output value of the detection electrode in a first period for supplying the drive signal to the peripheral electrode, the detector calculates a second detected value based on the output value of the detection electrode in a second period for supplying a voltage signal different from the drive signal to the peripheral electrode, the detector calculates spatial coordinates of the object to be detected in the space on the detection region using a value calculated based on a difference value between the first detected value and the second detected value, the detector determines the output value of the detection electrode obtained in the first period to be a first detection reference value and determines the output value of the detection electrode obtained in the second period to be a second detection reference value when the object to be detected is not present in the space on the detection region, and the detector calculates the first detected value by subtracting the first detection reference value from the output value of the detection electrode obtained in the first period and calculates the second detected value by subtracting the second detection reference value from the output value of the detection electrode obtained in the second period to calculate the spatial coordinates of the object to be detected.

2. The detecting device according to claim 1, wherein the voltage signal is a predetermined reference potential.

3. The detecting device according to claim 1, wherein the voltage signal is a GND potential.

4. The detecting device according to claim 1, wherein the voltage signal is an opposite-phase signal of the drive signal.

5. The detecting device according to claim 1, wherein the detector calculates a correction value by multiplying the difference value by a correction coefficient corresponding to the difference value and adds the correction value to the first detected value to calculate the spatial coordinates of the object to be detected.

6. The detecting device according to claim 1, wherein the detector calculates a correction value by multiplying the difference value by a value obtained by adding 1 to a correction coefficient corresponding to the difference value and adds the correction value to the second detected value to calculate the spatial coordinates of the object to be detected.

7. The detecting device according to claim 1, wherein, when a distance between the object to be detected and a first detection electrode near a center of the detection region and a distance between the object to be detected and a second detection electrode at an end of the detection region are substantially equal, a correction coefficient corresponding to the difference value is set such that a detected value at the first detection electrode and a detected value at the second detection electrode are substantially equivalent.

* * * * *